United States Patent
Kanabar et al.

(10) Patent No.: US 9,967,020 B2
(45) Date of Patent: May 8, 2018

(54) FACILITATING COMMUNICATIONS BETWEEN ON-BOARD ELECTRONIC DEVICES AND TERRESTRIAL DEVICES

(71) Applicant: GOGO LLC, Itasca, IL (US)

(72) Inventors: Paresh Kanabar, Naperville, IL (US); Bryan Adrian Lauer, Hinckley, IL (US); Kathy Wang, Buffalo Grove, IL (US); Tony LaMarca, Loves Park, IL (US); Premkumar Bangole, Bloomingdale, IL (US); Pat Walsh, Naperville, IL (US)

(73) Assignee: GOGO LLC, Chicago, IL (US)

( * ) Notice: Subject to any disclaimer, the term of this patent is extended or adjusted under 35 U.S.C. 154(b) by 13 days.

(21) Appl. No.: 14/312,413

(22) Filed: Jun. 23, 2014

(65) Prior Publication Data

US 2015/0131519 A1    May 14, 2015

Related U.S. Application Data

(60) Provisional application No. 61/901,634, filed on Nov. 8, 2013.

(51) Int. Cl.
*H04B 7/14* (2006.01)
*H04L 29/06* (2006.01)
(Continued)

(52) U.S. Cl.
CPC ........... *H04B 7/14* (2013.01); *H04B 7/18506* (2013.01); *H04L 65/60* (2013.01); *H04W 4/14* (2013.01); *H04W 84/005* (2013.01)

(58) Field of Classification Search
CPC ............ H04B 7/14; H04B 7/18506; H04L 65/60; H04W 4/14; H04W 84/005
(Continued)

(56) References Cited

U.S. PATENT DOCUMENTS 5,546,397 A    8/1996 Mahany
5,557,656 A    9/1996 Ray et al.
(Continued)

FOREIGN PATENT DOCUMENTS

EP    0902551 A2    3/1999
EP    1976152 A1    10/2008
(Continued)

OTHER PUBLICATIONS

"Aero Mobile Terminals: Models 2540/2532" Product Sheet, ViaSat, 2 pp. (2012).
(Continued)

*Primary Examiner* — Omar J Ghowrwal
*Assistant Examiner* — Kokou R Detse
(74) *Attorney, Agent, or Firm* — Marshall, Gerstein & Borun LLP; Randall G. Rueth

(57) ABSTRACT

Techniques for facilitating data communications among electronic devices via various communication networks are provided. A first electronic device may be connected to a terrestrial network and a second electronic device may be connected to an on-board communications network of a vehicle. A first voice- or message-based content may be received from the first electronic device, for delivery to the second electronic device. A data center may transmit a corresponding forward communication to the second electronic device via a satellite communication link. The data center may also receive a return communication from the second electronic device via either the satellite communication link or a terrestrial communication link, and transmit corresponding content to the first electronic device.

20 Claims, 15 Drawing Sheets

(51) Int. Cl.
*H04W 4/14* (2009.01)
*H04W 84/00* (2009.01)
*H04B 7/185* (2006.01)

(58) Field of Classification Search
USPC .......................................................... 370/315
See application file for complete search history.

(56) References Cited

U.S. PATENT DOCUMENTS

| | | | |
|---|---|---|---|
| 5,652,795 | A | 7/1997 | Dillon et al. |
| 5,699,384 | A | 12/1997 | Dillon |
| 5,722,074 | A | 2/1998 | Muszynski |
| 5,740,366 | A | 4/1998 | Mahany et al. |
| 5,844,893 | A | 12/1998 | Gollnick et al. |
| 5,940,771 | A | 8/1999 | Gollnick et al. |
| 5,995,725 | A | 11/1999 | Dillon |
| 5,995,726 | A | 11/1999 | Dillon |
| 6,009,328 | A | 12/1999 | Muszynski |
| 6,016,388 | A | 1/2000 | Dillon |
| 6,122,514 | A | 9/2000 | Spaur et al. |
| 6,125,184 | A | 9/2000 | Dillon et al. |
| 6,131,160 | A | 10/2000 | Dillon et al. |
| 6,161,141 | A | 12/2000 | Dillon |
| 6,310,582 | B1 | 10/2001 | Uetake et al. |
| 6,374,311 | B1 | 4/2002 | Mahany et al. |
| 6,665,536 | B1 | 12/2003 | Mahany |
| 6,697,415 | B1 | 2/2004 | Mahany |
| 6,704,303 | B1 | 3/2004 | Bowman-Amuah |
| 6,714,559 | B1 | 3/2004 | Meier |
| 6,788,935 | B1 | 9/2004 | McKenna et al. |
| 6,810,527 | B1 | 10/2004 | Conrad et al. |
| 7,013,138 | B2 | 3/2006 | Mahany |
| 7,062,268 | B2 | 6/2006 | McKenna |
| 7,107,062 | B2 | 9/2006 | Cruz et al. |
| 7,113,780 | B2 | 9/2006 | McKenna et al. |
| 7,242,931 | B2 | 7/2007 | Leuca et al. |
| 7,386,002 | B2 | 6/2008 | Meier |
| 7,457,646 | B2 | 11/2008 | Mahany et al. |
| 7,483,696 | B1 | 1/2009 | Mitchell |
| 7,535,921 | B2 | 5/2009 | Meier |
| 7,536,167 | B2 | 5/2009 | Gollnick et al. |
| 7,548,553 | B2 | 6/2009 | Meier |
| 7,558,569 | B2 | 7/2009 | Chang et al. |
| 7,636,552 | B2 | 12/2009 | Monk |
| 7,702,328 | B2 | 4/2010 | Lemond et al. |
| 7,710,907 | B2 | 5/2010 | Mahany |
| 7,715,853 | B1 | 5/2010 | Frerking et al. |
| 7,751,814 | B2 | 7/2010 | Cruz et al. |
| 7,873,343 | B2 | 1/2011 | Gollnick et al. |
| 7,916,747 | B2 | 3/2011 | Meier |
| RE42,536 | E | 7/2011 | Leuca et al. |
| 8,068,829 | B2 | 11/2011 | Lemond et al. |
| 8,078,163 | B2 | 12/2011 | Lemond et al. |
| 8,094,605 | B2 | 1/2012 | Lynch et al. |
| 8,169,946 | B2 | 5/2012 | Lynch et al. |
| 8,280,309 | B2 | 10/2012 | Monk |
| 8,358,971 | B2 | 1/2013 | Schiff |
| 8,452,276 | B2 | 5/2013 | Lauer |
| 8,499,324 | B1 | 7/2013 | Mitchell et al. |
| 8,646,010 | B2 | 2/2014 | Bengeult et al. |
| 9,369,991 | B2* | 6/2016 | Lauer ...................... H04W 4/06 |
| 2002/0004401 | A1* | 1/2002 | Heppe ................ H04B 7/18508 455/456.1 |
| 2002/0016164 | A1* | 2/2002 | Mead ................. H04B 7/18506 455/414.1 |
| 2002/0087992 | A1 | 7/2002 | Bengeult et al. |
| 2002/0160773 | A1 | 10/2002 | Gresham et al. |
| 2002/0170060 | A1 | 11/2002 | Lyman |
| 2003/0041155 | A1 | 2/2003 | Nelson et al. |
| 2003/0214966 | A1 | 11/2003 | Taylor |
| 2004/0097192 | A1 | 5/2004 | Schiff |
| 2005/0053026 | A1 | 3/2005 | Mullan et al. |
| 2005/0077424 | A1 | 4/2005 | Schneider |
| 2005/0286452 | A1 | 12/2005 | Hardgrave et al. |
| 2006/0030311 | A1 | 2/2006 | Cruz et al. |
| 2006/0040612 | A1* | 2/2006 | Min ..................... H04B 7/1858 455/12.1 |
| 2006/0229070 | A1 | 10/2006 | de La Chapelle et al. |
| 2006/0252422 | A1* | 11/2006 | Kauffman .......... B64D 45/0015 455/431 |
| 2006/0281404 | A1 | 12/2006 | Lee et al. |
| 2007/0021117 | A1 | 1/2007 | McKenna et al. |
| 2007/0042772 | A1 | 2/2007 | Salkini et al. |
| 2008/0004016 | A1 | 1/2008 | Smee et al. |
| 2008/0115007 | A1 | 5/2008 | Jalali |
| 2008/0141314 | A1 | 6/2008 | Lemond et al. |
| 2008/0182573 | A1 | 7/2008 | Lauer et al. |
| 2008/0198997 | A1* | 8/2008 | Sterman .................. H04L 12/66 379/220.01 |
| 2008/0240029 | A1 | 10/2008 | Lynch et al. |
| 2008/0274734 | A1* | 11/2008 | Kostanic ............ H04B 7/18508 455/431 |
| 2009/0070841 | A1 | 3/2009 | Buga et al. |
| 2009/0086611 | A1 | 4/2009 | Isshiki et al. |
| 2009/0096857 | A1 | 4/2009 | Frisco et al. |
| 2009/0183215 | A1 | 7/2009 | McCartie et al. |
| 2009/0279490 | A1 | 11/2009 | Alcorn |
| 2010/0035607 | A1 | 2/2010 | Horr et al. |
| 2010/0091660 | A1 | 4/2010 | Morita |
| 2010/0098034 | A1 | 4/2010 | Tang et al. |
| 2010/0099443 | A1* | 4/2010 | King ...................... H04W 4/12 455/466 |
| 2010/0189089 | A1 | 7/2010 | Lynch et al. |
| 2011/0116373 | A1 | 5/2011 | Lauer |
| 2011/0122811 | A1 | 5/2011 | Yuan et al. |
| 2011/0223926 | A1 | 9/2011 | Nakao et al. |
| 2011/0265128 | A1 | 10/2011 | Bengeult et al. |
| 2011/0314488 | A1 | 12/2011 | Keen et al. |
| 2013/0142045 | A1 | 6/2013 | Nakamura et al. |
| 2013/0195106 | A1 | 8/2013 | Calmon et al. |
| 2014/0052825 | A1* | 2/2014 | Luecke ................. H04L 67/327 709/219 |
| 2014/0156844 | A1 | 6/2014 | Cavgalar |
| 2014/0282684 | A1 | 9/2014 | Keen et al. |
| 2014/0282727 | A1 | 9/2014 | Keen et al. |
| 2015/0131512 | A1 | 5/2015 | Lauer et al. |
| 2015/0131513 | A1 | 5/2015 | Lauer et al. |
| 2015/0131519 | A1 | 5/2015 | Kanabar et al. |
| 2015/0318913 | A1 | 11/2015 | Lauer et al. |

FOREIGN PATENT DOCUMENTS

| | | |
|---|---|---|
| EP | 2568533 A1 | 3/2013 |
| JP | 2005-159873 A | 6/2005 |
| JP | 2007-538460 A | 12/2007 |
| JP | 2008-135946 A | 6/2008 |
| JP | 2010213266 A | 9/2010 |
| JP | 2011205659 A | 10/2011 |
| JP | 2012-147050 A | 8/2012 |
| WO | WO-99/31821 | 6/1999 |
| WO | WO-01/41317 | 6/2001 |
| WO | WO-2008/045205 | 4/2008 |
| WO | WO-2012/114728 A1 | 8/2012 |

OTHER PUBLICATIONS

"Direcway™ DW3000/DW4000 Series Systems: Satisfying the Need for Speed for the Multimedia Internet," Hughes Network Systems, 2 pp. (Jun. 2001).
"Exede® Internet: Fastest In-Flight Wi-Fi Unleash the Internet," ViaSat, 4 pp. (2012).
"Gogo Partners with AeroSat to Bring Ku-Satellite Service to Market," Gogo LLC, 2 pp. (May 18, 2012).
"Hughes and ThinKom Demonstrate New Tactical Communications Solutions," press release, Hughes Network Systems, LLC, 2 pp. (Oct. 25, 2012).
"Hughes HX200 Broadband Satellite Router," Hughes Network Systems, LLC, 2 pp. (2012).
ETSI Technical Specification 102 441 (v1.1.1), "Digital Video Broadcasting (DVB); DVB-S2 Adaptive Coding and Modulation

(56) References Cited

OTHER PUBLICATIONS for Broadband Hybrid Satellite Dialup Applications", European Telecommunications Standards Institute (ETSI), European Broadcasting Union, 23 pp. (2005).
European Standard 301 195 (v1.1.1), "Digital Video Broadcasting (DVB); Interaction channel through the Global System for Mobile communications (GSM)," European Telecommunications Standards Institute (ETSI), 14 pp. (Feb. 1999).
European Telecommunication Standard (ETS 300 801), "Digital Video Broadcasting (DVB); Interaction channel through Public Switched Telecommunications Network (PSTN) / Integrated Services Digital Networks (ISDN)," European Telecommunications Standards Institute (ETSI), 14 pp. (Aug. 1997).
International Preliminary Report on Patentability (Chapter II), International Application No. PCT/US2014/064809, dated Jan. 18, 2016.
International Search Report and Written Opinion, International Application No. PCT/US2014/064809, dated Feb. 26, 2015.
Office Action, European Patent Application No. 14835641.3, dated Mar. 7, 2017.
Second Office Action, Chinese Patent Application No. 201480061088.6, dated Jun. 19, 2017.
The Notification of the Second Office Action, Chinese patent application No. 201480072544.7, dated Aug. 2, 2017.
First Office Action, Japanese Patent Application No. 2016-528909, dated Aug. 1, 2017.
Japanese Patent Application No. 2016/528898, Notice of Reasons for Refusal, dated Oct. 3, 2017.
First Office Action, Chinese patent application No. 201480072544.7, dated Jan. 4, 2017.

* cited by examiner

FACILITATING COMMUNICATIONS BETWEEN ON-BOARD ELECTRONIC DEVICES AND TERRESTRIAL DEVICES

CROSS-REFERENCE TO RELATED APPLICATIONS

The present application claims priority to and the benefit of the filing date of U.S. Provisional Application No. 61/901,634, filed on Nov. 8, 2013 and entitled "HYBRID COMMUNICATIONS FOR DEVICES ON VEHICLES," the entire disclosure of which is hereby incorporated by reference herein. Additionally, the present application is related to U.S. patent application Ser. No. 14/291,878 entitled "SYSTEMS AND METHODS FOR FACILITATING COMMUNICATIONS ORIGINATING FROM A NON-TERRESTRIAL NETWORK", the contents of which are hereby incorporated by reference in their entirety, and the present application is also related to co-pending U.S. patent application Ser. No. 14/292,035 entitled "SYSTEMS AND METHODS FOR FACILITATING COMMUNICATIONS DESTINED FOR A NON-TERRESTRIAL NETWORK", the contents of which are hereby incorporated by reference in their entirety.

Still further, the present application is related to co-pending U.S. patent application Ser. No. 13/675,200 entitled "VEHICLE DATA DISTRIBUTION SYSTEM AND METHOD" and filed on Nov. 13, 2012, co-pending U.S. patent application Ser. No. 13/675,194 entitled "COMMUNICATIONS SYSTEM AND METHOD FOR NODES ASSOCIATED WITH A VEHICLE" and filed on Nov. 13, 2012, and co-pending U.S. patent application Ser. No. 13/675,190 entitled "GROUND SYSTEM FOR VEHICLE DATA DISTRIBUTION" and filed on Nov. 13, 2012. The entire contents of these related applications are hereby incorporated by reference in their entireties.

FIELD AND BACKGROUND OF THE DISCLOSURE

Technical Field

The instant disclosure generally relates to delivering communications to and from devices that are on-board vehicles, and, in particular, to systems and methods for facilitating communications between electronic devices via various communication networks.

Background

Currently, existing airlines and other transportation companies provide various services to mobile or wireless devices (e.g., cellular phones, smart devices, laptops, tablet computers, etc.) when such devices are on-board a vehicle while the vehicle is en route to a destination. However, the delivery of terrestrial or native features (e.g., roaming, texting, simultaneous calls, etc.) to mobile or wireless devices while a vehicle is in transit presents difficulties. Typically, to support native, terrestrial features of a mobile or wireless device in a non-terrestrial environment, cellular base stations such as "picocells" are installed on-board the vehicle, and the mobile device connects, via the cellular radio of the mobile device and the on-board cellular base stations, to an on-board network. In some cases, hardware in addition to the cellular base stations is also installed on-board the vehicle. This extraneous infrastructure is both limiting and extremely expensive. Moreover, the radio transmissions produced on-board the vehicle may interfere with ground-based cellular systems. For example, if mobile devices on-board the vehicle cannot find an adequate cellular band to which they may connect (e.g., when on-board cellular base stations are deactivated), the mobile devices will automatically increase their power, which may interfere with ground-based terrestrial cell sites as well as quickly drain the batteries of the mobile devices.

Some existing terrestrial communications systems are able to provide internet-based network connections to mobile devices while on-board a vehicle. For example, some communications systems are equipped with Wi-Fi capability that enables the mobile devices to access websites and stream multimedia. However, these communications systems are not able to provide mobile devices with terrestrial or native communication features (i.e., cellular-based communications) while the mobile devices are on-board the vehicle.

Accordingly, there is an opportunity to leverage existing communications infrastructure to facilitate cellular-based communications via electronic devices while the electronic devices are connected to a non-terrestrial communications network.

BRIEF SUMMARY OF THE DISCLOSURE

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In an embodiment, a method of providing communications to and from a first electronic device connected to a terrestrial network and a second electronic device connected to an on-board communications network is provided. The method includes receiving, from the first electronic device via a service provider network, a first voice- or message-based content that identifies the second electronic device, generating a forward communication (i) including the first voice- or message-based content and (ii) indicating the second electronic device, and transmitting the forward communication to the second electronic device via a satellite communication link. The method further includes receiving a return communication from the second electronic device via a terrestrial communication link, the return communication (i) including a second voice- or message-based content, and (ii) indicating the first electronic device, and transmitting the second voice- or message-based content to the first electronic device via the service provider network.

In another embodiment, a system for providing communications to and from a first electronic device connected to a terrestrial network and a second electronic device connected to an on-board communications network is provided. The system includes a communication module configured to send and receive data, and a data center comprising a memory and a processor, and communicatively connected to the communication module. The data center is configured to receive, from the first electronic device via a service provider network, a first voice- or message-based content that identifies the second electronic device, generate a forward communication (i) including the first voice- or message-based content and (ii) indicating the second electronic device, and transmit, via the communication module, the forward communication to the second electronic device via a satellite communication link. The data center is further configured to receive a return communication from the second electronic device via a terrestrial communication link, the return communication (i) including a second voice- or message-based content, and (ii) indicating the first electronic device, and transmit, via the communication module, the second voice- or message-based content to the first electronic device via the service provider network.

In a further embodiment, a method of providing communications to and from a first electronic device connected to a terrestrial network and a second electronic device connected to an on-board communications network is provided. The method includes receiving, from the first electronic device via a service provider network, a first voice- or message-based content that identifies the second electronic device, generating a forward communication (i) including the first voice- or message-based content and (ii) indicating the second electronic device, and transmitting the forward communication to the second electronic device via a satellite communication link. The method further includes receiving a return communication from the second electronic device via the satellite communication link, the return communication (i) including a second voice- or message-based content, and (ii) indicating the first electronic device, and transmitting the second voice- or message-based content to the first electronic device via the service provider network.

DETAILED DESCRIPTION OF THE PREFERRED EMBODIMENTS

Figure 1:
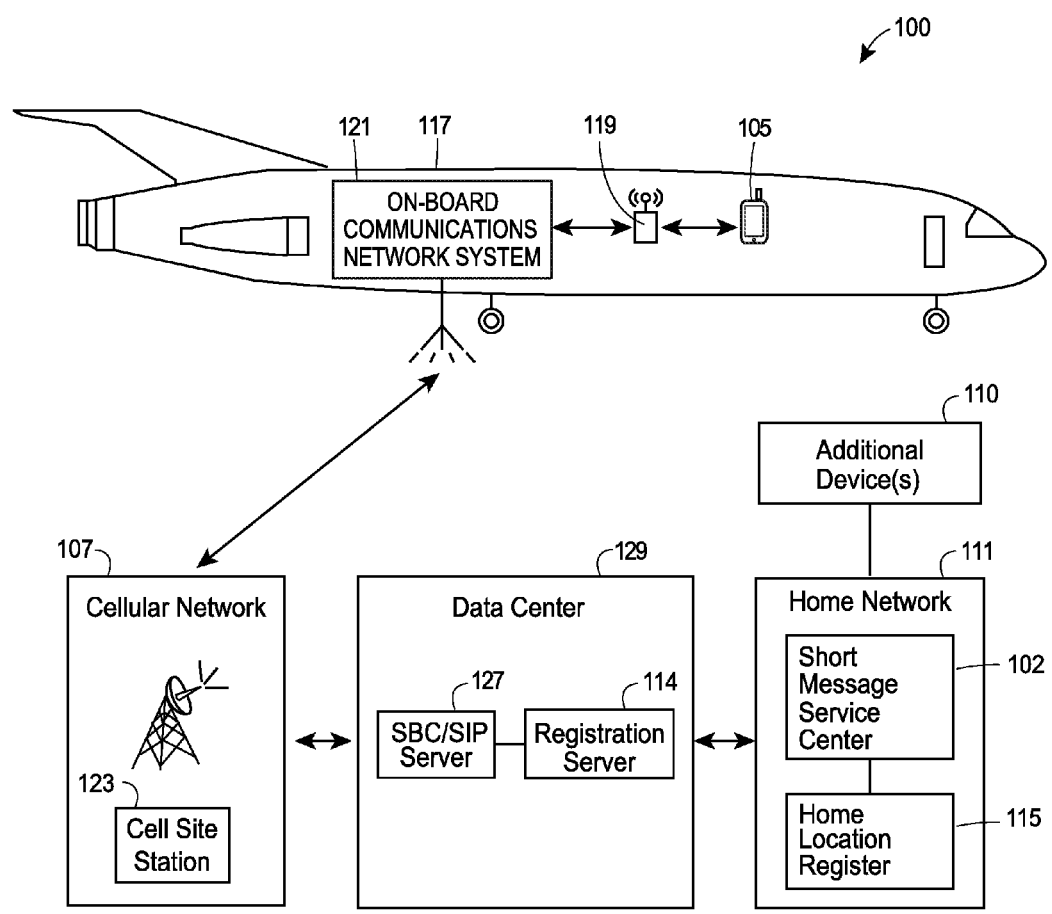
FIG. 1 illustrates an exemplary representation of electronic devices and components capable of facilitating text-based communications among electronic devices, in accordance with some embodiments.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Additionally, any or all of the contents of the present disclosure may operate in conjunction with any or all of the contents of the disclosure of co-pending U.S. patent application Ser. No. 13/675,200 entitled "VEHICLE DATA DISTRIBUTION SYSTEM AND METHOD," the contents of which are hereby incorporated by reference in their entirety. Further, any or all of the contents of the present disclosure may operate in conjunction with any or all of the contents of the disclosure of co-pending U.S. patent application Ser. No. 13/675,194 entitled "COMMUNICATIONS SYSTEM AND METHOD FOR NODES ASSOCIATED WITH A VEHICLE," the contents of which are hereby incorporated by reference in their entirety, and any or all of the contents of the present disclosure may operate in conjunction with any or all of the contents of the disclosure of co-pending U.S. patent application Ser. No. 13/675,190 entitled "GROUND SYSTEM FOR VEHICLE DATA DISTRIBUTION," the contents of which are hereby incorporated by reference in their entirety.

Still further, any or all of the contents of the present disclosure may operate in conjunction with any or all of the contents of the disclosures of co-pending U.S. patent application Ser. No. 14/291,878 entitled "SYSTEMS AND METHODS FOR FACILITATING COMMUNICATIONS ORIGINATING FROM A NON-TERRESTRIAL NETWORK" and co-pending U.S. patent application Ser. No. 14/292,035 entitled "SYSTEMS AND METHODS FOR FACILITATING COMMUNICATIONS DESTINED FOR A NON-TERRESTRIAL NETWORK", the contents of which are hereby incorporated by reference in their entireties.

FIG. 1 illustrates an example representation 100 of components configured to facilitate cellular-based communications among electronic devices. In particular, the components of the representation 100 are configured to facilitate text-based communications (e.g., short message service (SMS) messages) between an electronic device 105 connected to a non-terrestrial-based network and one or more additional devices 110 connected to a terrestrial-based network. Generally, as referred to herein, a "terrestrial-based" or "ground-based" network refers to any network that electronic devices may connect to while in a terrestrial environment, but may not easily communicate while being transported by a high-speed or high-elevation vehicle such as an airplane. Similarly, a "non-terrestrial-based" or "non-ground-based" network refers to any network that electronic devices may connect to while not in range of a ground-based network or while not able to easily connect to a ground-based network, such as while the electronic devices are being transported by a high-speed or high-elevation vehicle such as an airplane. Generally, the external network includes ground systems and ground computing devices that are essentially fixed in location. Further, the external network includes base stations or infrastructure containing equipment via which devices may wirelessly access the external network may be contained in one or more buildings or other structures that are fixedly attached to the ground or to earth.

Each of the electronic device 105 and the additional device 110 may be any type of standalone or portable electronic device capable of communicating via one or more networks. For example, each of the electronic device 105 and the additional device 110 may be a mobile phone, a Personal Digital Assistant (PDA), a smart phone, a tablet computer, a multimedia player, a desktop or notebook computer, an MP3 player, a digital broadcast receiver, or any other electronic apparatus. Each of the electronic device 105 and the additional device 110 may also have a subscription or plan with a cellular services provider, whereby the cellular services provider supports cellular communications conducted via the electronic device 105 and/or the additional device 110.

As illustrated in FIG. 1, the electronic device 105 is transported by or otherwise located within a vehicle 117. In embodiments, the vehicle 117 may be owned and/or operated by an individual, or the vehicle may be owned and/or operated by a company, organization or governmental entity. The vehicle 117 may be one of a fleet of vehicles. The vehicle 117 may be used to transport passengers who pay for or otherwise are granted passage on the vehicle. The vehicle 117 may be used to transport executives or staff of a company or organization and their guests. The vehicle 117 may be used to transport live or inanimate cargo, packages, mail, and/or other types of passengers or cargo. Furthermore, although FIG. 1 depicts the vehicle 117 as an aircraft, the techniques and principles described herein equally apply to other types of vehicles such as trucks, automobiles, busses, trains, boats, ships, barges, subway cars, helicopters, ambulances or other emergency vehicles, military vehicles, other air-borne, water-borne, or land-borne vehicles, and vehicles that are suitable for space travel.

The vehicle 117 is equipped with a wireless access point 119 and an on-board communications network system 121. At any given moment in time, the on-board communications network system 121 may be in communicative connection with one or more data or communications networks that are disposed, managed, and/or hosted, for the most part (if not entirely), externally to the vehicle 117. For example, an external network may be a public, ground-based data or communications network, such as the Internet and/or the PSTN (Public Switched Telephone Network). The external network may also be a ground-based private data and/or communications network. Further, the external network may be a cellular network 107 that includes a cell site station 123. Generally, the external network includes ground systems and ground computing devices that are essentially fixed in location. Further, the external network includes base stations or infrastructure containing equipment via which devices may wirelessly access the external network may be contained in one or more buildings or other structures that are fixedly attached to the ground or to earth.

The electronic device 105 can connect to the on-board communications network system 121 via the wireless access point 119. Generally, the on-board communications network system 121 may be disposed, managed, and/or hosted entirely on-board the vehicle 117. For example, the on-board communications network system 121 may be a Wi-Fi network that is contained and operates within the cabin of the vehicle 117. The on-board communications network system 121 may utilize any known communication protocol or combinations thereof, such as a wireless protocol, a wired protocol, other ARINC standard-compatible protocols, or a private protocol. In an example, the on-board communications network system 121 utilizes an IEEE 802.11 compatible protocol to communicate with the electronic device 105. In another example, the on-board communications network system 121 utilizes a hypertext transfer protocol (HTTP) and a Near Field Communications (NFC)-compatible protocol (e.g., Bluetooth®) to communicate with the electronic device 105.

The on-board communications network system 121 can also facilitate and manage communications between the electronic device 105 and the cell site station 123 of the cellular network 107. According to embodiments, the on-board communications network system 121 and the cell site station 123 may collectively make up an air-to-ground (ATG) communication network for aircraft use. In embodiments, the on-board communications network system 121 and the cell site station 123 can facilitate any type of data communication via any wireless standard or technology (e.g., GSM, CDMA, TDMA, WCDMA, LTE, EDGE, OFDM, GPRS, EV-DO, UWB, and others).

The cell site station 123 of the cellular network 107 can connect, via one or more various wired or wireless networks, to a ground-based data center 129 having components for securely facilitating communications between the electronic device 105 and other electronic devices, such as the additional device 110. In particular, the cell site station 123 includes a session border controller (SBC) and session initiation protocol (SIP) server 127 (which may be separate servers or combined into the same server) and a registration server 114. The registration server 114 may be any combination of hardware and software elements configured to directly or indirectly communicate with the electronic device 105 and the additional device 110, and facilitate the functionalities and communications described herein. Further, the SBC/SIP server 127 can facilitate and manage communication sessions among the electronic device 105, the additional device(s) 110, and the data center 129 using the SIP signaling communications protocol.

Although the embodiments herein are described as operating with the SIP signaling protocol, it should be appreciated that other standard or proprietary application protocols are envisioned. For example, other envisioned protocols include hypertext transfer protocol (HTTP), simple mail transfer protocol (SMTP), transmission control protocol (TCP), user datagram protocol (UDP), Internet control message protocol (ICMP), internet message access protocol (IMAP), and others.

According to embodiments, the electronic device 105 can download and install a communication application (not shown in FIG. 1) that enables cellular-based communications when the electronic device 105 is located in the vehicle 117. Further, the electronic device 105 can use the communication application to register and create an account with the registration server 114, as discussed in co-pending application Ser. Nos. 14/291,558 and 14/291,511, to enable the electronic device 105 to communicate over various air-borne communication networks, such as an air-to-ground (ATG) communication network for aircraft use.

As illustrated in FIG. 1, the registration server 114 may connect, via a cellular-based network, to a home network 111 associated with the electronic device 105. The cellular-based network may be a wide area network (WAN) configured to facilitate any type of data communication via any standard or technology (e.g., GSM, CDMA, TDMA, WCDMA, LTE, EDGE, OFDM, GPRS, EV-DO, UWB, and others). Generally, the home network 111 of the electronic device 105 may be administered or provided by a cellular communications service provider with which the user (i.e., subscriber) of the electronic device 105 has an agreement to send and receive wireless communications services and features. Accordingly, the home network 111 of the electronic device 105 may administrate or manage a home location register (HLR) 115 and/or a visiting location register (VLR) (not shown in FIG. 1), among other databases or components, to support and manage cellular communication, roaming, and other features for the electronic device 105 according to the services agreement. Additionally, the cellular radio frequency (RF) communications band utilized by the home network 111 to wirelessly communicate with mobile devices may be an RF band designated for AMPs, TDMA, CDMA, GSM, PCS, 3G, 4G, 5G, and/or any other terrestrial cellular radio frequency band. Generally, a cellular radio frequency band is a portion of RF spectrum that is allocated by a governmental agency or other body which governs the usage of spectrum. In some networks, more than one cellular RF band may be supported.

The HLR 115 can include a database that stores identifications of electronic devices that are authorized to communicate via the home network 111. In particular, for each authorized device, the HLR 115 can store the corresponding international mobile subscriber identity (IMSI), which is a unique number that identifies each authorized device (or more particularly, identifies the SIM card of each authorized device). The HLR 115 can also pair each IMSI with a mobile subscriber integrated services digital network number (MSISDN) that corresponds to a telephone number of the authorized device. The home network 111 further includes a short message service center (SMSC) 102 configured to store, forward, convert, and deliver cellular-based messages (e.g., text messages such as SMS messages). In particular, the SMSC 102 can forward, to the data center 129, messages originated by the additional device 110 and intended for the electronic device 105. Further, the SMSC 102 can send, to the additional device 110, messages received from the electronic device 105 via the data center 129.

According to embodiments, the components of the representation 100 are configured to facilitate the communication of cellular-based messages between and among the electronic device 105 and the one or more additional devices 110. In one embodiment, the data center 129 can receive, via the on-board communications network system 121 and the cellular network 107, a message from the electronic device 105 traveling in the vehicle 117, whereby the message is intended for the additional device 110. Because the message is initiated as an internet-based communication, the message is not configured for delivery to the additional device 110 as a conventional cellular-based message. Accordingly, the data center 129 can perform various techniques associated with the message so that the message is configured to be delivered, via the home network 111, to the additional device 110 as a conventional cellular-based message.

In another embodiment, the data center 129 can receive a message from the additional device 110 via the home network 111, whereby the message is intended for the electronic device 105 traveling in the vehicle 117. Because the message is initiated as a cellular-based communication, the message is not configured for delivery to the electronic device 105 because the electronic device 105 is not directly connected to a cellular-based network. Accordingly, the data center 129 can perform various techniques associated with the message so that the message is configured to be delivered, via the cellular network 107 and the on-board communications network system 121, to the electronic device 105 as an internet-based message.

Figure 2:
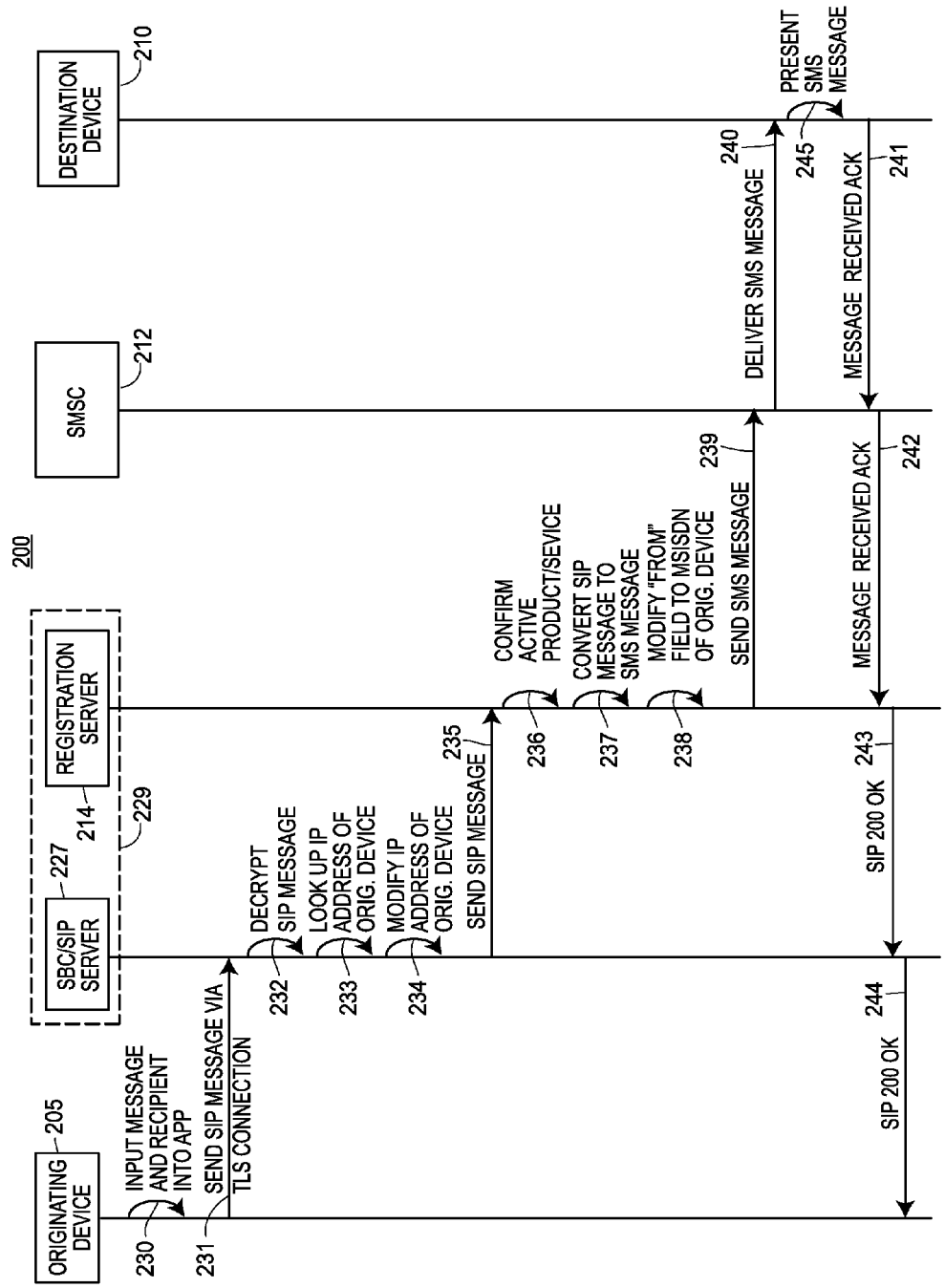
FIG. 2 depicts an example signal diagram associated with facilitating a text-based communication that originates from an electronic device connected to a non-terrestrial network, in accordance with some embodiments.

FIG. 2 illustrates a signal diagram 200 associated with facilitating the communication of a text-based communication or message that originates from an origination device 205 connected to a non-ground-based network, such as if the origination device 205 is located on board a vehicle such as an aircraft. According to embodiments described herein, the text-based communication can be an SMS message, however it should be appreciated that other text-based or multimedia-based communications are envisioned. The signal diagram 200 includes the originating device 205 (such as the electronic device 105 as discussed with respect to FIG. 1), a data center 229 including an SBC/SIP server 227 (such as the SBC/SIP server 127 as discussed with respect to FIG. 1) and a registration server 214 (such as the registration server 114 as discussed with respect to FIG. 1), an SMSC 212 (such as the SMSC 112 as discussed with respect to FIG. 1), and a destination device 210 (such as the destination device 110 as discussed with respect to FIG. 1).

According to embodiments, a user of the originating device 205 may select a service or product from a list of available services or products that may include various cellular connectivity options for the originating device 205 that are based on time durations, data limits, or other parameters. For example, the list of services or products can include an option to send and receive unlimited text-based communications during a particular flight.

To initiate the communication of the text-based message, a user can use the originating device 205 to input (230) the message body and an identification of the recipient. In particular, the identification of the recipient can be an MSIDSN (i.e., telephone number) associated with the destination device 210. In some embodiments, the user can initiate the message using a communication application that has already been registered with an on-board communications network system of the vehicle and/or with the registration server 214. Further, the communication application can convert the text-based message into an SIP-based message, whereby the SIP message includes a uniform resource indicator (URI) that indicates the IMSI and/or MSISDN associated with the originating device 205.

Although not illustrated in FIG. 2, the originating device 205 can initiate a transport layer security (TLS) connection with the SBC/SIP server 427 using a digital certificate. In particular, the certificate can be the certificate that the registration server 214 issues to the originating device 205 during the device registration technique. The registration server 214 (acting as the certificate authority (CA)) can validate the certificate and send a success response to the SBC/SIP server 227. Responsive to receiving the success response, the SBC/SIP server 227 can establish the TLS connection with the originating device 205.

The originating device 205 can send (231) the SIP message to the SBC/SIP server 227 via the established TLS connection. The SBC/SIP server 227 can decrypt (232) the SIP message and look up (233) the IP address associated with the originating device 205. In particular, the IP address can be a care-of address (CoA) that the SBC/SIP server 227 has previously associated with the originating device 205. The SBC/SIP server 227 can modify (234) the IP address of the originating device 205 by replacing the IP address included in the SIP message with the CoA associated with the originating device 205.

After modifying the IP address, the SBC/SIP server 227 can send (235) the SIP message with the modified IP address to the registration server 214. The registration server 214 can examine the SIP message and confirm (236) that the originating device 205 has an active product or service. The registration server 214 can also convert (237) the SIP message into an SMS message according to the proper communication protocol (e.g., GSM, CDMA, etc.). Further, the registration server 214 can modify (238) the "from" field of the SMS message to the MSISDN of the originating device 205. In particular, the registration server 214 can use the identification of the originating device 205 that is specified in the SIP message (e.g., the IMSI of the originating device 205) to look up the MSISDN of the originating device 205.

After generating the SMS message, the registration server 214 can send (239) the SMS message to the SMSC 202, and the SMSC 202 can deliver (240) the SMS message to the destination device 210. When the destination device 210 receives the SMS message, the MSISDN included in (238) will enable the SMS message to appear as a conventional cellular-based SMS, instead of a message that originates as an SIP message as in (231). In particular, the appearance of the delivered SMS does not differ from the appearance of an SMS message that is sent from one mobile device to another mobile device via a cellular network.

Upon receiving the SMS message from the SMSC 202, the destination device 210 can present (245) the SMS message in a user interface. In some embodiments, the destination device 210 can present the body or textual portion of the SMS message via an application installed on the destination device 210. Further, the destination device 210 can send (241) a message received acknowledgement to the SMSC 202, which can be respectively forwarded to the registration server 214 (242), to the SBC/SIP server 227 (243), and to the originating device 205 (244).

Figure 3:
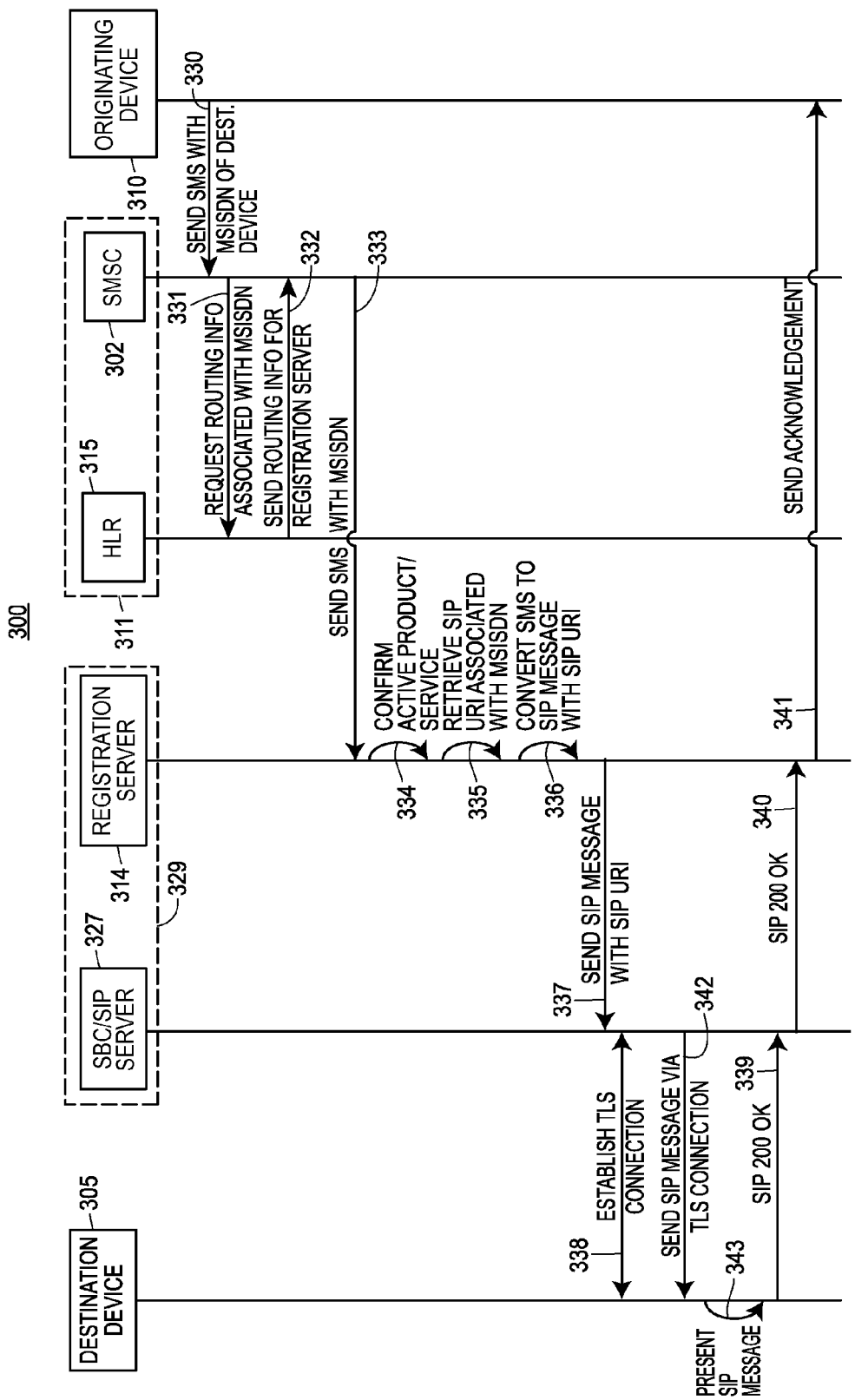
FIG. 3 depicts an example signal diagram associated with facilitating a text-based communication that is intended for an electronic device connected to a non-terrestrial network, in accordance with some embodiments.

FIG. 3 illustrates a signal diagram 300 associated with facilitating the delivery of a text-based communication or message that originates from an originating device 310 connected to a terrestrial-based network. Further, the text-based communication is intended for a destination device 305 that is connected to a non-terrestrial-based network, such as if the destination device 305 is located on board a vehicle such as an aircraft. According to embodiments described herein, the text-based communication can be an SMS message, however it should be appreciated that other text-based or multimedia-based communications are envisioned. The signal diagram 300 includes the destination device 305 (such as the electronic device 105 as discussed with respect to FIG. 1), a data center 329 including an SBC/SIP server 327 (such as the SBC/SIP server 127 as discussed with respect to FIG. 1) and a registration server 314 (such as the registration server 114 as discussed with respect to FIG. 1), a home network 311 including an HLR 315 and an SMSC 312 (such as the HLR 115 and the SMSC 112 as discussed with respect to FIG. 1), and the originating device 310 (such as the additional device 110 as discussed with respect to FIG. 1). For purposes of discussion, it should be appreciated that the destination device 305 has already completed the registration procedure with the registration server 314, and has also purchased a product or service that enables text-based communication via the non-terrestrial-based network.

To initiate the communication of the text-based message, a user can use the originating device 310 to compose the SMS message (e.g., using a conventional text messaging application), specify the recipient (e.g., via including the MSISDN of the destination device 305), and select to send the SMS message. In operation, the originating device 310 sends (330) the SMS message to the SMSC 302. Upon receiving the SMS message, the SMSC 302 requests (331), from the HLR 315 associated with the destination device 305, routing information associated with the MSISDN specified in the SMS message. Because the destination device 305 has previously registered with the registration server 314, the registration server 314 previously updated the location of the destination device 305 with the HLR 315 and therefore the HLR 315 is "aware" of the associated between the destination device 305 and the registration server 314. Accordingly, the HLR 315 can send (332) the routing information associated with the destination device 305, which can be the routing number of the registration server 314.

Using the routing number, the SMSC 302 can send (333) the SMS message with the MSISDN of the destination device 305 to the registration server 314. The registration server 314 can examine the MSISDN to confirm (334) that there is an active product or service associated with the destination device 305. In particular, a user of the destination device 305 can have previously selected (e.g., on an in-flight trip), a service or product from a list of available services or products that may include various cellular connectivity options for the destination device 305 that are based on time durations, data limits, or other parameters. The registration server 314 can also retrieve (335) an SIP URI associated with the MSISDN of the destination device 305. In particular, the SIP URI may have been previously associated with the MSISDN during the registration of the destination device 305 with the registration server 314.

The registration server 314 can convert (336) the SMS message into an SIP message using the SIP URI, according to various techniques or communication protocols (e.g., CDMA, GSM, etc.). The registration server 314 can also send (337) the SIP message with the SIP URI to the SBC/SIP server 327. According to embodiments, the SBC/SIP server 327 can establish (338) a TLS connection with the destination device 305 using a digital certificate or according to other techniques. Further, the SBC/SIP server 327 can send (342) the SIP message to the destination device 305 via the established TLS connection. The destination device 305 can present (343) the SIP message to a user of the destination device 305. In some embodiments, the destination device 305 can present the body or textual portion of the SIP message via an application installed on the destination device 305. After receiving the SIP message, the destination device 305 can send (339) a message received acknowledgement to the SBC/SIP server 327, which can be respectively forwarded to the registration server 314 (340) and to the originating device (310).

Figure 4:
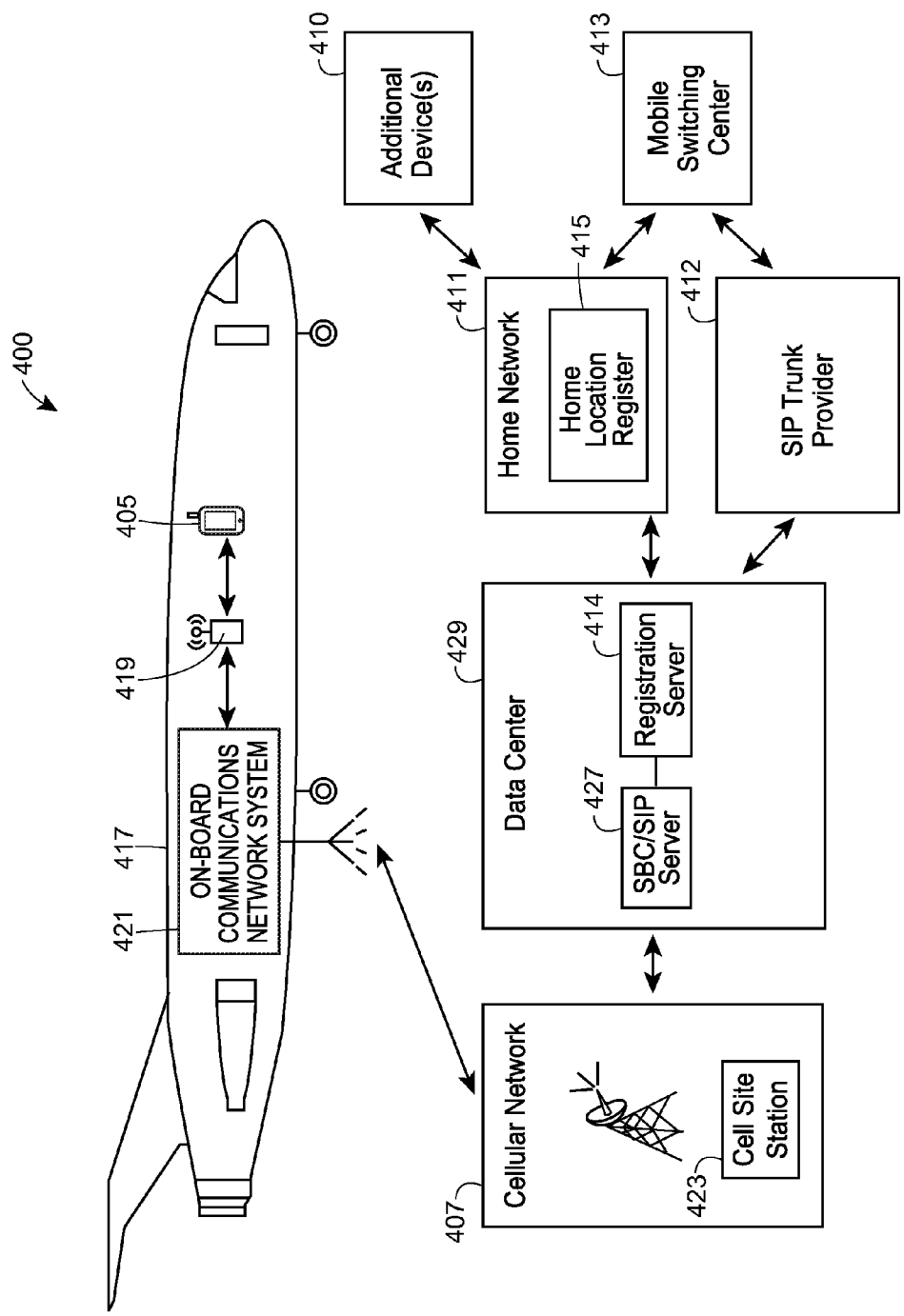
FIG. 4 illustrates an exemplary representation of electronic devices and components capable of facilitating voice-based communications between electronic devices, in accordance with some embodiments.

FIG. 4 illustrates an example representation 400 of components configured to facilitate cellular-based communications among electronic devices. In particular, the components of the representation 400 are configured to facilitate voice-based communications (e.g., VoIP calls) between an electronic device 405 connected to a non-terrestrial-based network and one or more additional devices 410 connected to a terrestrial-based network.

Similar to the electronic device 105 and the additional device 110 of FIG. 1, each of the electronic device 405 and the additional device 410 may be any type of standalone or portable electronic device capable of communicating via one or more networks. For example, each of the electronic device 405 and the additional device 410 may be a mobile phone, a Personal Digital Assistant (PDA), a smart phone, a tablet computer, a multimedia player, a desktop or notebook computer, an MP3 player, a digital broadcast receiver, or any other electronic apparatus. Each of the electronic device 405 and the additional device 410 may also have a subscription or plan with a cellular services provider, whereby the cellular services provider supports cellular communications conducted via the electronic device 405 and/or the additional device 410.

As illustrated in FIG. 4, the electronic device 405 is transported by or otherwise located within a vehicle 417, similar to the vehicle 117 as discussed with respect to FIG. 1. The vehicle 417 is equipped with a wireless access point 419 and an on-board communications network system 421. At any given moment in time, the on-board communications network system 421 may be in communicative connection with one or more data or communications networks that are disposed, managed, and/or hosted, for the most part (if not entirely), externally to the vehicle 417. For example, an external network may be a public, ground-based data or communications network, such as the Internet and/or the PSTN (Public Switched Telephone Network). The external network may also be a ground-based private data and/or communications network. Further, the external network may be a cellular network 407 that includes a cell site station 423. Typically, ground systems and ground computing devices may be essentially fixed in location, and base stations or infrastructure containing equipment via which devices may wirelessly access the ground system may be contained in one or more buildings or other structures that are fixedly attached to the ground or to earth.

The electronic device 405 can connect to the on-board communications network system 421 via the wireless access point 419. Generally, the on-board communications network system 421 may be disposed, managed, and/or hosted entirely on-board the vehicle 417. For example, the on-board communications network system 421 may be a Wi-Fi network that is contained and operated within the cabin of the vehicle 417. The on-board communications network system 421 may utilize any known communication protocol or combinations thereof, such as a wireless protocol, a wired protocol, other ARINC standard-compatible protocols, or a private protocol. In an example, the on-board communications network system 421 utilizes an IEEE 802.11 compatible protocol to communicate with the electronic device 405. In another example, the on-board communications network system 421 utilizes a hypertext transfer protocol (HTTP) and a Near Field Communications (NFC)-compatible protocol (e.g., Bluetooth®) to communicate with the electronic device 405.

The on-board communications network system 421 can also facilitate and manage communications between the electronic device 405 and the cell site station 423 of the cellular network 407. According to embodiments, the on-board communications network system 421 and the cell site station 423 may collectively make up an air-to-ground (ATG) communication network for aircraft use. In embodiments, the on-board communications network system 421 and the cell site station 423 can facilitate any type of data communication via any wireless standard or technology (e.g., GSM, CDMA, TDMA, WCDMA, LTE, EDGE, OFDM, GPRS, EV-DO, UWB, and others).

The cell site station 423 of the cellular network 407 can connect, via one or more various wired or wireless networks, to a ground-based data center 429 having components for securely facilitating communications between the electronic device 405 and other electronic devices, such as the additional device 410. In particular, the cell site station 423 includes a SBC/SIP server 427 (which may be separate servers or combined into the same server) and a registration server 414. The registration server 414 may include any combination of hardware and software elements configured to directly or indirectly communicate with the electronic device 405 and the additional device 410, and facilitate the functionalities and communications described herein. Further, the SBC/SIP server 427 can facilitate and manage communication sessions among the electronic device 405, the additional device(s) 4101, and the data center 429 using the SIP signaling communications protocol.

According to embodiments, the electronic device 405 can download and install a communication application (not shown in FIG. 1) that enables the cellular-based communications when the electronic device 405 is located in the vehicle 417. Further, the electronic device 405 can use the communication application to register and create an account with the registration server 414. The registration configures the electronic device 405 to communicate over various air-borne communication networks, such as an air-to-ground (ATG) communication network for aircraft use.

As illustrated in FIG. 4, the registration server 414 may connect, via a cellular-based network, to a home network 411 associated with the electronic device 405. The cellular-based network may be a wide area network (WAN) configured to facilitate any type of data communication via any standard or technology (e.g., GSM, CDMA, TDMA, WCDMA, LTE, EDGE, OFDM, GPRS, EV-DO, UWB, and others). Generally, the home network 411 of the electronic device 405 may be administered or provided by a cellular communications service provider with which the user (i.e., subscriber) of the electronic device 405 has an agreement to receive wireless communications services and features. Accordingly, the home network 411 of the electronic device

405 may administrate or manage an HLR 415 and/or a VLR (not shown in FIG. 4), among other databases or components, to support and manage cellular communication, roaming, and other features according to the services agreement. Additionally, the cellular radio frequency (RF) communications band utilized by the home network 411 to wirelessly communicate with mobile devices may be an RF band designated for AMPs, TDMA, CDMA, GSM, PCS, 3G, 4G, 5G, and/or any other terrestrial cellular radio frequency band. Generally, a cellular radio frequency band is a portion of RF spectrum that is allocated by a governmental agency or other body which governs the usage of spectrum. In some networks, more than one cellular RF band may be supported.

The HLR 415 can include a database that stores identifications of electronic devices that are authorized to communicate via the home network 411. In particular, for each authorized device, the HLR 415 can store the corresponding IMSI, which is a unique number that identifies each authorized device (or more particularly, identifies the SIM card of each authorized device). The HLR 415 can also pair each IMSI with an MSISDN that corresponds to a telephone number of the authorized device.

The data center 429 can further be configured to communicate with an SIP trunk provider 412. According to embodiments, the SIP trunk provider 412 enables VoIP and streaming media communications by which internet telephony service providers (ITSPs) deliver telephone services and unified communications to customers equipped for SIP-based communications. Each of the home network 411 and the SIP trunk provider 412 (as well as the data center 429) may communicate with a mobile switching center (MSC) 413. According to embodiments, the MSC 413 routes voice calls and other messaging services to and from end devices, such as the electronic device 405 and the additional device(s) 410. In particular, the MSC 413 sets up and releases end-to-end connections, and manages mobility and hand-over requirements during calls, among other services as known in the art.

According to embodiments, the components of the representation 400 are configured to facilitate voice-based communications between the electronic device 405 and the one or more additional devices 410. In one embodiment, the data center 429 can receive an SIP message initiated by the electronic device 405 traveling while in the vehicle 417, whereby the SIP message is intended to set up a voice communication with the additional device 410. Because the SIP message is initiated as an internet-based communication, the SIP message is not configured to set up a conventional telephone call with the additional device 410. Accordingly, the data center 429 can perform various techniques associated with the message, as well as leverage the SIP trunk provider 412 and the MSC 413, so that an RTP stream may be established between the electronic device 405 and the additional device 410 to facilitate the voice-based communication.

In another embodiment, the additional device 410 can initiate a voice-based communication intended for the electronic device 405. The SIP trunk provider 412 can initiate the voice-based communication setup by sending a message to the data center 429. The data center 429 can perform various techniques associated with the message, as well as leverage the cellular network 407, so that an RTP stream may be established between the electronic device 405 and the additional device 410 to facilitate the voice-based communication.

Figure 5:
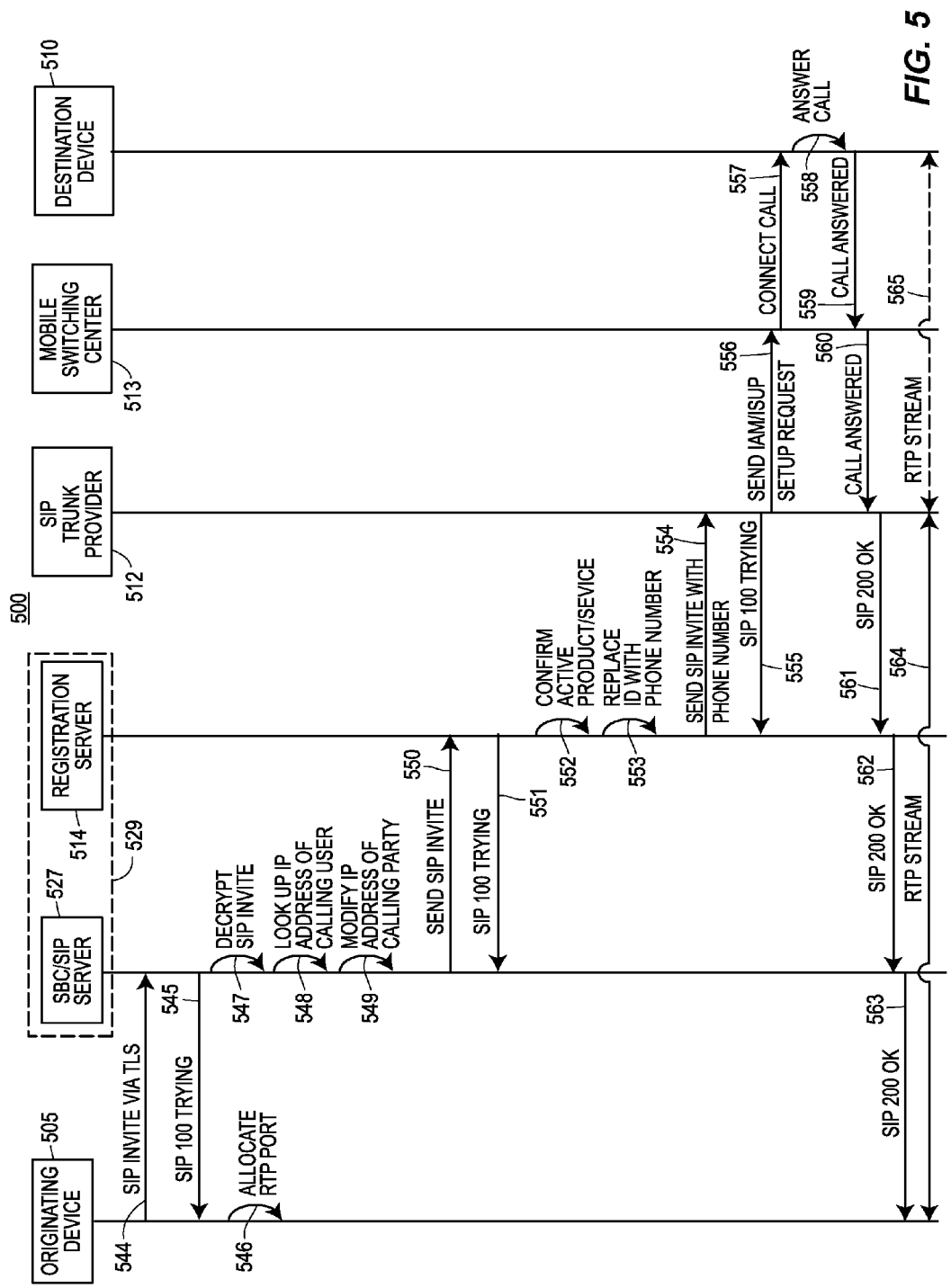
FIG. 5 depicts an example signal diagram associated with facilitating a voice-based communication that originates from an electronic device connected to a non-terrestrial network, in accordance with some embodiments.

FIG. 5 illustrates a signal diagram 500 associated with facilitating a voice-based communication that originates from an originating device 505 connected to a non-ground-based network, such as if the originating device 505 is located on board a vehicle such as an aircraft. The voice-based communication can be intended for a destination device 510 that is connected to a terrestrial-based network. According to embodiments discussed herein, the voice-based communication can be a VoIP call, however it should be appreciated that other voice-based communications are envisioned. The signal diagram 500 includes the originating device 505 (such as the electronic device 405 as discussed with respect to FIG. 4), a data center 529 including an SBC/SIP server 527 (such as the SBC/SIP server 427 as discussed with respect to FIG. 4) and a registration server 514 (such as the registration server 414 as discussed with respect to FIG. 4), an SIP trunk provider 512 (such as the SIP trunk provider 412 as discussed with respect to FIG. 4), a mobile switching center 513 (such as the mobile switching center 413 as discussed with respect to FIG. 4), and the destination device 510 (such as the additional device 410 as discussed with respect to FIG. 4). For purposes of discussion, it should be appreciated that the originating device 505 has already completed the registration procedure with the registration server 514, and has also purchased a product or service that enables voice-based communication via the non-ground-based network.

A user of the originating device 505 can use an application that is registered with the registration server 514 to initiate the voice-based communication (e.g., a VoIP call). In particular, the user can input an MSISDN (i.e., telephone number) associated with the destination device 510 and select to initiate the call. Although not illustrated in FIG. 5, the originating device 505 can establish a TLS connection with the SBC/SIP server 527, for example using a digital certificate obtained during registration with the registration server 514. The originating device 505 can send (544) an SIP invitation request associated with the VoIP call to the SBC/SIP server 527 via the TLS connection. The SIP invitation request can include an identification of the originating device 505, such as the IMSI of the originating device 505. The SBC/SIP server 527 can respond (545) to the originating device 505 with an SIP 100 trying message. Responsive to receiving the SIP 100 trying message, the originating device 505 can allocate (546) an RTP port and listen for a communication on the RTP port.

The SBC/SIP server 527 can decrypt (547) the SIP message and look up (548) the IP address associated with the originating device 505. In particular, the IP address can be a care-of address (CoA) that the SBC/SIP server 527 has previously associated with the originating device 505. The SBC/SIP server 527 can modify (549) the IP address of the originating device 505 by replacing the IP address included in the SIP message with the CoA associated with the originating device 505. After modifying the IP address, the SBC/SIP server 527 can send (550) the SIP invite message with the modified IP address to the registration server 514. The registration server 514 can examine the SIP invite message and confirm (552) that the originating device 505 has an active product or service. The registration server 514 can also replace (553) the identification of the originating device 505 (e.g., the IMSI of the originating device 505) that is specified in the SIP invite message with the phone number (e.g., MSISDN) associated with the originating device 505.

The registration server 514 can send (554) the SIP invite message with the phone number associated with the originating device 505 to the SIP trunk provider 512, and the SIP trunk provider 512 can respond (555) to the registration server 514 with an SIP 100 trying message. Responsive to receiving the SIP invite message from the registration server 514, the SIP trunk provider 512 can send (556) an initial address message/ISDN user part (IAM/ISUP) setup request to the mobile switching center 513, and the mobile switching center 513 can connect (557) the VoIP call with the destination device 510.

As illustrated in FIG. 5, a user of the destination device 510 can cause the destination device 510 to answer (558) the call, which triggers a call answered acknowledgement to be sent (559) to the mobile switching center 513. The mobile switching center 513 can forward (560) the call answered acknowledgement to the SIP trunk provider 512. Upon receiving the call answered acknowledgement, the SIP trunk provider 512 can send (561) an SIP 200 OK message to the registration server 514, which can forward (562) the SIP 200 OK message to the SBC/SIP server 527, and which can forward (563) the SIP 200 OK message to the originating device 505 to notify the originating device 505 that the destination device 510 has answered the call. An RTP stream can be established (564, 565) via which voice-based communications may be facilitated between the originating device 505 and the destination device 510.

Although not illustrated in FIG. 5, it should be appreciated that functionalities for handling other various voice-based communication scenarios are envisioned. In particular, if the destination device 510 does not answer the voice-based call, an SIP 480 No Response message may be relayed to the originating device 505. Further, the originating device 505 may cancel the call before the destination device 510 answers the call, in which case SIP cancel messages may be relayed to the various devices and components.

Figure 6:
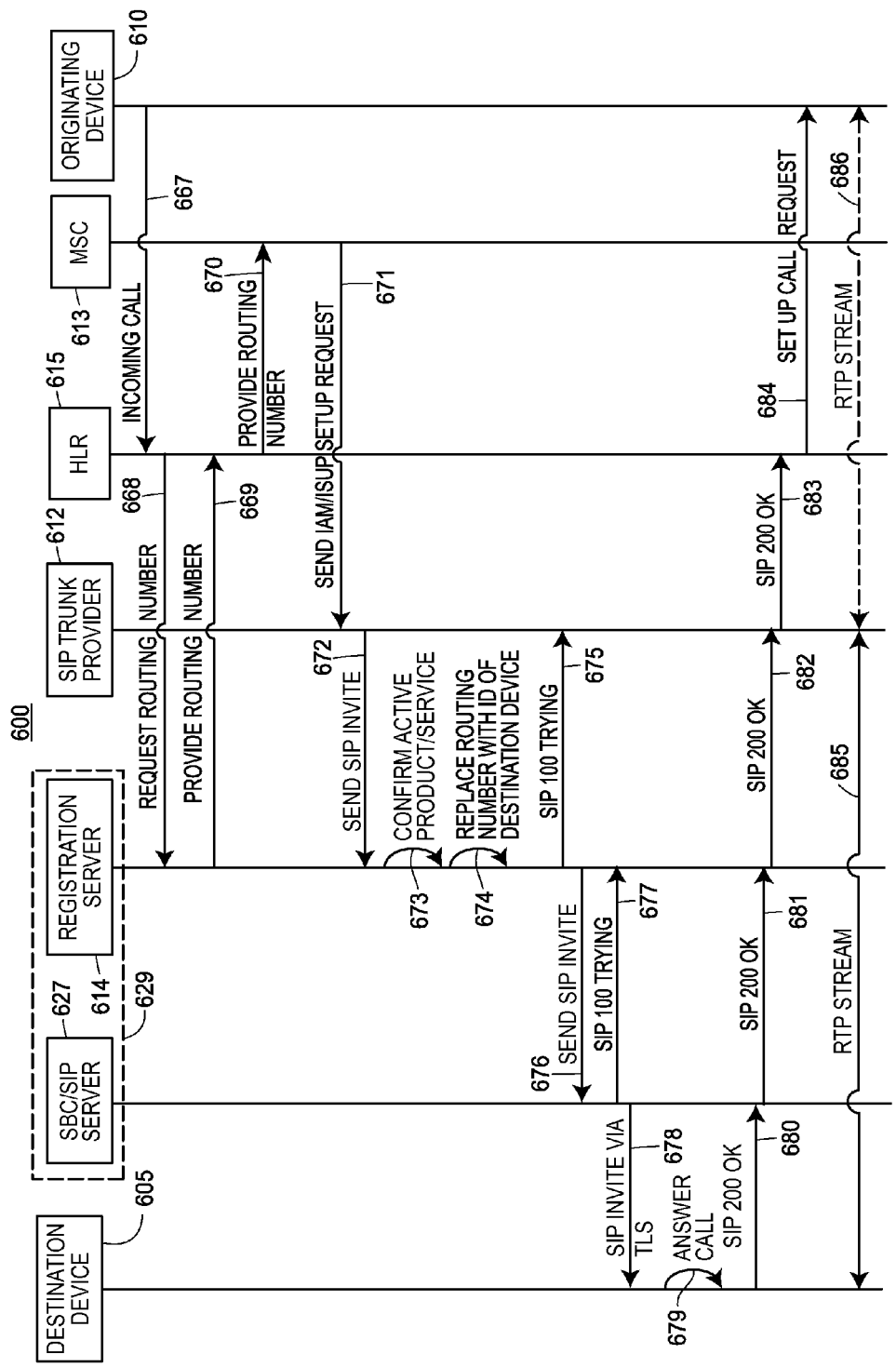
FIG. 6 depicts an example signal diagram associated with facilitating a voice-based communication that is intended for an electronic device connected to a non-terrestrial network, in accordance with some embodiments.

FIG. 6 illustrates a signal diagram 600 associated with facilitating a voice-based communication that originates from an originating device 610 connected to a terrestrial-based network. Further, the voice-based communication is intended for a destination device 605 that is connected to a non-terrestrial-based network, such as if the destination device 605 is located on board a vehicle such as an aircraft. According to embodiments discussed herein, the voice-based communication can be a VoIP call, however it should be appreciated that other voice-based communications are envisioned. The signal diagram 600 includes the destination device 605 (such as the electronic device 405 as discussed with respect to FIG. 4), a data center 629 including an SBC/SIP server 627 (such as the SBC/SIP server 427 as discussed with respect to FIG. 4) and a registration server 614 (such as the registration server 414 as discussed with respect to FIG. 4), an SIP trunk provider 612 (such as the SIP trunk provider 412 as discussed with respect to FIG. 4), an HLR 615 (such as the HLR 415 as discussed with respect to FIG. 4), a mobile switching center 613 (such as the mobile switching center 413 as discussed with respect to FIG. 4), and the originating device 610 (such as the additional device 410 as discussed with respect to FIG. 4). For purposes of discussion, it should be appreciated that the destination device 605 has already completed the registration procedure with the registration server 414, and has also purchased a product or service that enables voice-based communication via the non-terrestrial-based network.

A user of the originating device 610 can use the originating device 610 to initiate the voice-based communication (e.g., a VoIP call), for example via a telephone application. In particular, the user can input a telephone number associated with the destination device 605 and select to initiate the VoIP call. The originating device 610 can place (667) the VoIP call, which causes the originating device 610 to send a request to the HLR 615 associated with the destination device 605. The HLR 615 examines a destination of the call (i.e., the destination device 605) and can request (668) a routing number for the destination device 605 from the registration server 614. The registration server 614 can allocate a routing number for the destination device 605 and provide (669) the routing number to the HLR 615, which can forward (670) the routing number to the MSC 613. After receiving the routing number, the MSC 613 send (671) an IAM/ISUP setup request indicating the routing number to the SIP trunk provider 612.

The SIP trunk provider 612 can use the IAM/ISUP setup request to generate an SIP invite message that includes the routing number and send (672) the SIP invite message to the registration server 614. The registration server 614 can examine the SIP invite message and confirm (673) that the destination device 605 has an active product or service. In particular, a user of the destination device 605 can have previously selected (e.g., on an in-flight trip) a service or product from a list of available services or products that may include various cellular connectivity options for the destination device 605 that are based on time durations, data limits, or other parameters. The registration server 614 can also replace (674) the routing number specified in the SIP invite message with an identification associated with the destination device 605. In embodiments, the identification of the destination device 605 can be the IMSI of the destination device 605. The registration server 614 can send (676) the SIP invite message to the SBC/SIP server 627 and also send (675) an SIP 100 trying message to the SIP trunk provider 612.

According to embodiments, after receiving the SIP invite message, the SBC/SIP server 627 and the destination device 605 can establish a TLS connection according to various techniques, such as using a digital certificate previously issued to the destination device 605 during the registration procedure. Further, the SBC/SIP server 627 can send (678) the SIP invite message to the destination device 605 via the established TLS connection. A user of the destination device 605 can cause the destination device 605 to answer (679) the call, which causes the destination device to send (680) an SIP 200 OK message to the SBC/SIP server 627. The SBC/SIP server 627 can forward (681) the SIP 200 OK message to the registration server 614, which forwards (682) the SIP 200 OK message to the SIP trunk provider 612, which forwards (683) the SIP 200 OK message to the HLR 615, which sets up (684) a call request with the originating device 610. An RTP stream can be established (685, 686) via which voice-based communications may be facilitated between the originating device 610 and the destination device 605.

Although not illustrated in FIG. 6, it should be appreciated that functionalities for handling other various voice-based communication scenarios are envisioned. In particular, if the destination device 605 does not answer the voice-based call, an SIP 480 No Response message may be relayed to the originating device 610. Further, if the destination device 605 is busy, an SIP 486 Busy Here message may be relayed among the various devices and components.

In some embodiments, the voice data from the voice-based calls as described with respect to FIGS. 5 and 6 may be converted into text-based data. Generally, passengers of a vehicle such as an airplane may not want to overhear another passenger of the vehicle participating in a voice call. The passengers may further not want to hear the other party of the voice call on the electronic device of the participating passenger on the vehicle (e.g., via a speakerphone feature of the electronic device). Therefore, it may be desirable to convert voice data to text data for at least the participating passenger. Further, it may be desirable to limit the participating passenger's ability to actively participate in a voice call while traveling in the vehicle.

In cases in which a voice-based communication is established between a first device connected to a non-ground-based network and a second device connected to a ground-based network, the first device may enable the user to input text (e.g., via an on-screen keyboard, a peripheral keyboard, or another channel) instead of receiving audio (i.e., speech). The first device may include logic to convert the inputted text into speech, such as through a text-to-speech application as known in the art. Accordingly, the second device can receive the speech converted from the text via the data center and output the converted speech via an audio output component. Similarly, the second device may include logic to convert audio data (i.e., speech) received from the user into text, such as through a speech recognition (SR) application as known in the art. The second device can send the generated text to the data center which forwards the generated text to the first device. Accordingly, instead of outputting received audio data, the first device can present the text that the second device converted from the initial audio data. In some cases, the second device need not convert the audio data and the first device may still output the audio data instead of text, such as in cases in which the audio is output via an earpiece speaker of the first device or via a headset. In still further cases, the voice call may be facilitated as a one-way voice call whereby the first device outputs received audio but does not transmit audio back to the second device (e.g., by muting a microphone).

The audio and text conversion techniques may alternatively be facilitated by other components. In some cases, the on-board communications network system of the vehicle may include modules or applications to perform either or both of the text-to-voice conversion or the voice-to-text conversion. In other cases, the data center (or more particularly, the registration server) may include modules or applications to perform either or both of the text-to-voice conversion or the voice-to-text conversion.

According to embodiments, the text- and voice-based communications may be facilitated via other networks in addition to or as an alternative to the terrestrial network implementation as described with respect to FIGS. 1-6. In one embodiment, a hybrid communications system may be employed to facilitate the text- and voice-based communications, whereby the data center 129 and the cellular network 107 as described with respect to FIG. 1 may facilitate some communications between electronic devices, and the data center 129 and a satellite-based network may facilitate other communications between the electronic devices. In another embodiment, the data center 129 and a satellite-based network may facilitate all of the communications between electronic devices.

Figure 7:
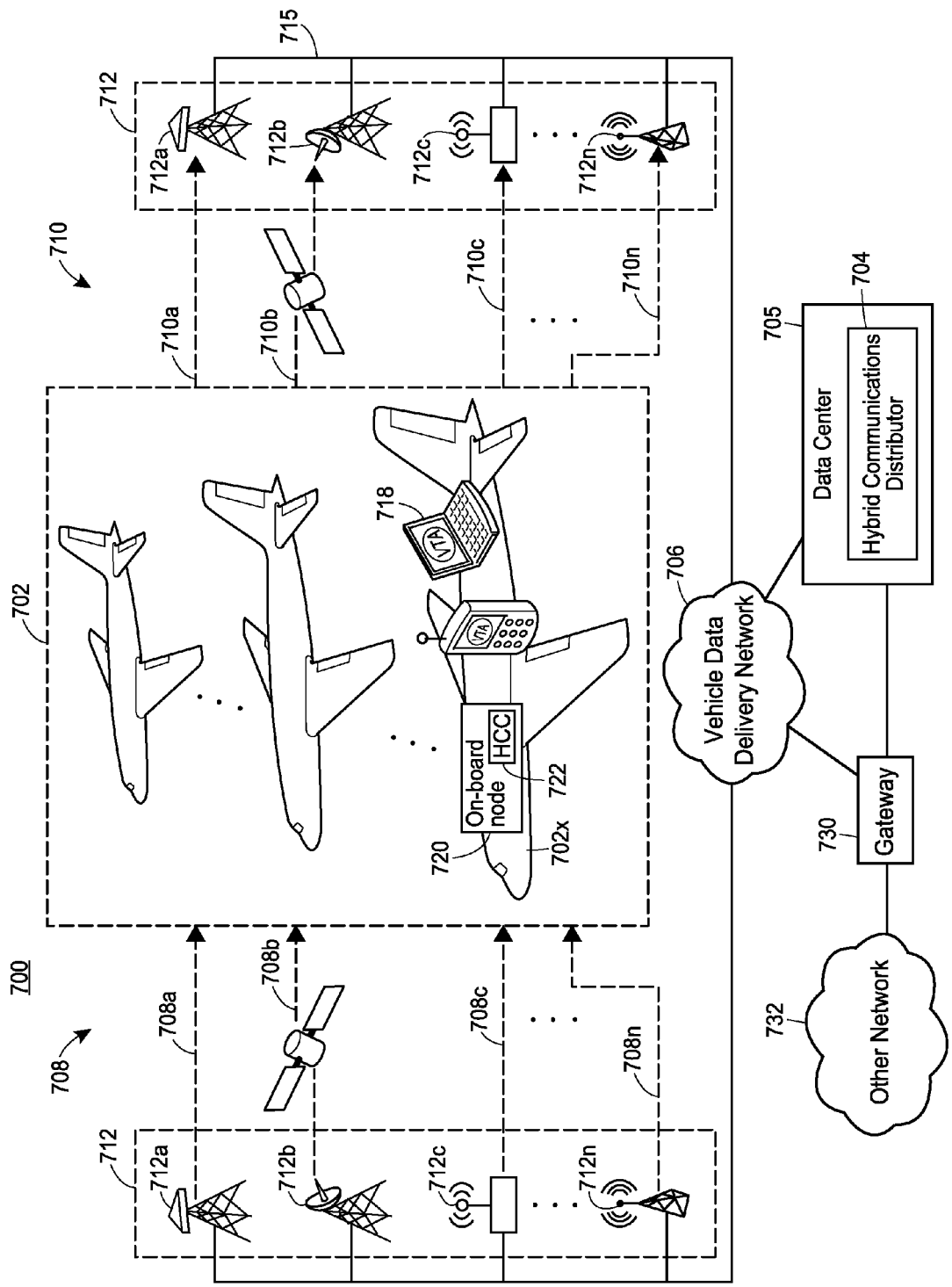
FIG. 7 illustrates an exemplary hybrid communications system for delivering data to and from devices that are on-board a set of vehicles, in accordance with some embodiments.

FIG. 7 is a block diagram depicting an example hybrid communications system 700 for communicating information or data to and from devices that are being transported by the vehicles 702. The system 700 is configured to deliver data or information to a specific device on-board one of the vehicles 702 (e.g., the device 718 on-board the vehicle 702x) from a data center 705 (such as the data center 129 as described with respect to FIG. 1) or from a hybrid communications distributor 704 included in the data center 705. In some implementations, the hybrid communications system 700 is configured to deliver feedback information from the vehicle 702x to the data center 705 or the hybrid communications distributor 704, and the data center 705 or the hybrid communications distributor 704 may use the feedback information to inform subsequent data delivery to the on-board device 718 or to other on-board devices. In an embodiment, the hybrid communications distributor 704 and the data center 705 are communicatively connected to the vehicles 702 via one or more vehicle data delivery networks 706, one or more forward links 708, and one or more reverse links 710.

One or more of the vehicles 702 may be owned and/or operated by a specific individual. In some cases, one or more of the vehicles 702 may be owned and/or operated by a company, organization or government entity. For example, the vehicles 702 may include a fleet of vehicles that are used to transport passengers who pay for or otherwise are granted passage on one of the vehicles of the fleet. The vehicles 702 may include one or more vehicles that are used by an organization to transport employees and their guests, in some situations. One or more of the vehicles 702 may be used to transport live or inanimate cargo, packages, mail, and/or other types of cargo. It is noted that although FIG. 7 depicts the vehicles 702 as being airplanes, the techniques and principles described herein equally apply to other types of vehicles such as trucks, automobiles, busses, trains, boats, ships, barges, subway cars, helicopters or other types of aircraft, ambulances or other emergency vehicles, military vehicles, other air-borne, water-borne, or land-borne vehicles, and vehicles that are suitable for space travel.

Each of the vehicles 702 may be communicatively connected to the data center 705 via one or more forward wireless communication links 708 and one or more reverse wireless communication links 710. The links 708, 710 may be collectively supported by a multiplicity of radio frequency (RF) bands. Typically, a particular frequency band or portion of RF spectrum supporting the links 708, 710 is allocated (e.g., by a governmental or regulatory body) for a particular type of wireless communications such as satellite communications, ham-radio communications, terrestrial cellular communications, near-field wireless communications, and the like. In some allocated frequency bands, the wireless communications may be transmitted over a forward link and a corresponding reverse link using a respective wireless communication protocol that is defined, designated or otherwise indicated by a standards association and/or by a government or other regulatory body. A particular frequency band may support a point-to-point wireless protocol and/or may support a broadband wireless protocol, for example.

Each frequency band may include one or more channels. The channels may be formed, defined or allocated by frequency division, time division, code division, some other suitable channel division, or some combination of divisions. Signals that are carried on a channel may or may not be multiplexed. Any one or more channels included in a frequency band may support (or may be designated to support) a forward link and/or a reverse link for wireless communications. Additionally, any one or more of the channels included in a frequency band may be used to deliver signaling, data payload, or a combination of signaling and data payload. For example, a particular frequency band may support an in-band protocol in which signaling and payload are transmitted over a same channel within the band, and/or the particular frequency band may support an out-of-band protocol in which the signaling and payload are respectively transmitted over different channels within the band.

A transceiver or modem that is fixedly connected to a vehicle 702x may be tuned to a particular frequency band, and thus, along with a respective antenna, may serve as one end of a communication link over which data may be received onto and/or sent from the vehicle 702x. Similarly, a transceiver or modem that is fixedly connected to a structure 712 external to the vehicle 702x may also be tuned to the particular frequency band, and thus, along with a respective antenna, may serve as the other end of the communication link over which the data is received onto and/or sent from the vehicle 702x. The structure 712 that supports the non-vehicle end of the communication link may be, for example, an entirely stationary terrestrial structure such as a building or tower on the ground, a relatively stationary terrestrial structure such as a barge in an ocean, or a non-terrestrial structure such as a satellite or other structure in space. In FIG. 7, the representations of the structures 712 are duplicated to more clearly illustrate the forward links 708 and reverse links 710, however, in practice, each structure 712 may be a unitary structure having a single physical transceiver or modem mounted thereon that services both the respective forward link 708 and the respective reverse link 710. For example, a teleport 712b may include a transceiver that services both the satellite forward link 708b and the satellite reverse link 710b of a particular frequency band allocated for satellite communications. In some instances, a single structure 712 may include multiple transceivers or modems, each of which may be tuned to a different frequency band.

With further regard to the structures 712, in addition to having a transceiver or modem supporting one end of a particular communication link 708, 710 to the vehicle 702x, each structure 712 may include another interface via which a communication path 715 to the hybrid communications distributor 704 at the data center 705 may be communicatively connected. The interface to the communication path 715 may be a wired or a wireless communications interface.

A vehicle 702x may include one or more fixedly connected modems or transceivers to support one or more communication links 708, 710 over one or more frequency bands, and the vehicle 702x may utilize these modems or transceivers to receive data onto the vehicle 702x and/or to transmit data from the vehicle 702x. For example, a vehicle 702x may include thereon a transceiver or modem tuned to a frequency band that is allocated for direct communications between vehicles 702 and ground stations, or on which a direct air-to-ground (ATG) communication link is supported (e.g., 849-851 MHz and 894-896 MHz). Such an ATG communication link is denoted in FIG. 7 by the forward link 708a and the reverse link 710a. A vehicle 702x may additionally or alternatively include thereon a transceiver or modem tuned to a frequency band that is allocated for satellite communications (denoted in FIG. 7 by the forward link 708b and the reverse link 710b), such as the L band (e.g., 40 to 60 GHz or 1 to 2 GHz), the $K_u$ band (e.g., 12-18 GHz), the $K_a$ band (e.g., 26.5-40 GHz), and/or other spectrum that is allocated for satellite communications.

Other examples of communication links that may be established with the vehicle 702x include terrestrial mobile or cellular communication links (denoted in FIG. 7 by the references 708c/710c), e.g., communication links that support TDMA (Time Division Multiple Access), GSM (Global System for Mobile Communications), CDMA (Code Division Multiple Access), Wi-MAX (Worldwide Interoperability for Microwave Access), LTE (Long Term Evolution), and/or other terrestrial mobile communications technologies. Yet another example of a type of communication link that may be established with the vehicle 702x is wireless local area network (WLAN) or Wi-Fi™ link supported on a Wi-Fi allocated frequency band (e.g., 2.4 and/or 5 GHz), and using a protocol corresponding to an IEEE (Institute of Electrical and Electronics Engineers) 802.11 standard, as denoted in FIG. 7 by reference 708c for a Wi-Fi forward link and reference 710c for a Wi-Fi reverse link. Still other examples types of wireless communication links that may be established with the vehicle 702x include infrared, microwave, or other optically-based or line-of-sight wireless communication links. It is clear, however, that any suitable wireless communication link including a forward and/or reverse link may support communications between the data center 705 or the hybrid communications distributor 704 and a vehicle 702x.

In an embodiment, one or more of the transceivers or modems fixedly connected to the vehicle 702x may be operated in a unidirectional mode, while one or more other transceivers or modems fixedly connected to the vehicle 702x may be operated in a bi-directional mode. For example, a transceiver or modem on the vehicle 702x that is tuned to a satellite communications spectrum may utilized in a receive-only mode, while another transceiver or modem on the vehicle 702x that is tuned to an ATG communications spectrum may be utilized in both receive and transmit modes.

Turning now to the hybrid communications distributor 704 included in the data center 705 of the system 700, the hybrid communications distributor 704 may comprise, in an embodiment, a set of computer executable instructions that are stored on one or more non-transitory, tangible, computer-readable storage media (e.g., one or more memories or data storage entities), and that are executable by one or more processors of the data center 705. (The data center 705 generally includes one or more computing devices having processors, and is described in more detail in a later section of the present disclosure.) The hybrid communications distributor 704 may manage data or information delivery, e.g., over the links 708 and 710, to and from a device 718 that is being transported by a vehicle 702x.

The device 718 may be a device that is fixedly connected to the vehicle 702x (e.g., a computing device that is included in a Line Replaceable Unit (LRU) on an aircraft), or the device may be a mobile device such as a smart phone, tablet or laptop that is temporarily being transported by the vehicle, e.g., a mobile computing device belonging to a passenger on-board the vehicle. In an embodiment, the device 718 is a computing device including at least one memory and at least one processor, and optionally, at least one user interface and at least one wireless network interface. As used herein, the terms "target device," "recipient device," and "device" are used interchangeably to refer to a device 718 that is on-board a vehicle or being transported by the vehicle, and to which data that is external to the vehicle is to be electronically delivered.

The data that is to be delivered to the device 718 may include any type of data. For example, the data may include user-consumable content data such as a text message, a web page, a media file, streaming data, and/or a response to a previous request received at a user interface of the device 718. In some cases, the data that is to be delivered to the device 718 includes data that is to be presented at a user interface of the device 718. In some scenarios, the data that is to be delivered to the device 718 may be an application, a configuration, an update, or software that the user of the device 718 has requested to be downloaded.

In an embodiment, the hybrid communications distributor 704 may select one of the forward links 708 that are supported by respective one or more allocated frequency bands for delivery of data or information to the device 718, and the hybrid communications distributor 704 may receive feedback data or information from the vehicle 702x over a reverse link 710 supported by a different allocated frequency band. For example, the hybrid communications distributor 704 may select, from the links 708, one particular forward link that is supported by a particular frequency band for forward data delivery to the device 718, e.g., the satellite communications forward link 708b. The hybrid communications distributor 704 may receive feedback information from the vehicle 702x via a particular reverse link, from the links 710, that is supported by a frequency band other than the particular frequency band over which the forward data was delivered, e.g., the ATG reverse link 710a. In some embodiments, the particular reverse link may be selected from the set of reverse links 710. Accordingly, in this embodiment, a forward link and a reverse link of different frequency bands are paired or associated for data delivery purposes.

At least because forward link and reverse links are supported by different frequency bands, a different messaging protocol and/or delivery scheme (e.g., broadcast, multicast, unicast) may be used for sending information to the vehicles 702 than is used for receiving feedback information from the vehicles 702. For instance, a broadband protocol may be utilized to deliver data over a selected forward link 708b, and a point-to-point protocol may be utilized to deliver data over a reverse link 710a. Additionally or alternatively, the hybrid communications distributor 704 may cause transmissions to be multicast over a forward link 708b, and may receive feedback information over a reverse link 710a in a unicast format. Such differing frequency bands, messaging protocols, and/or delivery schemes across the forward links 708 and the reverse links 708 and the selection(s) thereof may allow the hybrid communications system 700 to efficiently utilize available spectrum while, at the same time, adhering to existing modem constraints and/or regulatory requirements.

In an embodiment, the hybrid communications distributor 704 may select more than one forward link from the links 708 (each of which may be supported by a different frequency band) for distributed or hybrid delivery of data or information that is to be received, as a whole, at the device 718 on-board the vehicle 702x. For instance, the hybrid communications distributor 704 may select both the satellite communications forward link 708b and the ATG forward link 708a to deliver forward data, as a whole, to the device 718, and a first portion of the data may be delivered using the satellite forward link 708b while a second portion of the data may be delivered using the ATG forward link 708a. In some cases, more than two forward links 708 may be selected for distributed data delivery to the vehicle 702x. In this example, the hybrid communications distributor 704 may receive feedback information from the vehicle 702x via a reverse link that is included in the same frequency band as one of the selected forward links, e.g., the satellite communications reverse link 710b or the ATG reverse link 710a. Alternatively, the hybrid communications distributor 704 may receive feedback information from the vehicle 702x via a reverse link that is not included in the same frequency band as any of the selected forward links, e.g., the reverse link 710c.

Thus, in view of the above, in general the hybrid communications distributor 704 may utilize any suitable combination of selected forward links 708, reverse links 710, messaging protocols, and/or delivery schemes to transmit data to and receive feedback information from the vehicles 702 in a distributed or hybrid manner. The hybrid communications distributor 704 and its selection and usage of the one or more forward link(s) 708 and the reverse link(s) 710, messaging protocols, and/or delivery schemes for data delivery between the hybrid communications distributor 704 and the on-board devices 718 is discussed in more detail in later sections of this disclosure.

Turning now to the vehicles 702, some or all of the vehicles 702 (e.g., the vehicle 702x) may each include a respective on-board node 720 to manage data that is received onto the vehicle 702x and that is intended for delivery to a particular on-board device 718. The on-board node 720 may also manage data that is generated by the on-board devices 718 and that is to be transmitted from the vehicle 702x, in an implementation. Further, within the vehicle 702x itself, the on-board node 720 may manage communications of said data to and from the on-board devices 718, e.g., by using one or more communication networks that are contained within the vehicle 702x. In an embodiment, the on-board node 720 may include one or more computing devices that are communicatively connected to one or more transceivers or modems fixedly connected to the vehicle 702x, and are also communicatively connected to one or more wired and/or wireless communication networks contained within the vehicle 702x. In an embodiment, the on-board node 720 is included in an on-board data distribution system or device such as the data distribution device described in aforementioned co-pending U.S. patent application Ser. No. 13/675,200 entitled "VEHICLE DATA DISTRIBUTION SYSTEM AND METHOD."

In some cases, the on-board node 720 may include a hybrid communications collector 722. In an embodiment, the hybrid communications distributor 704 may comprise a set of computer executable instructions that are stored on a non-transitory, tangible computer-readable storage media (e.g., a memory) and are executable by one or more processors of the on-board node 720. The hybrid communications collector 722 may receive, via one or more of the forward links 708 and respective modem(s), communications that are provided by the hybrid communications distributor 704 whose contents are intended for delivery to a particular on-board device 718. The hybrid communications collector 722 may determine the recipient device 718, and may cause the contents of the received communications to be delivered via one or more on-board networks to the recipient device 718. Additionally, the hybrid communications collector 722 may cause feedback data or information to be transmitted via one or more reverse links 710 and their respective modem(s) for delivery to the hybrid communications distributor 704. The feedback data or information may include, for example, data or information associated with any one or more communications previously received over one or more of the forward links 708, data or information indicative of a state or condition of any one or more of the forward links 708, and/or data or information indicative of a state or condition of any one or more of the reverse links 710.

Turning now to the vehicle data delivery network 706, in an embodiment, at least a portion of the vehicle data delivery network 706 may be disposed in a terrestrial location, e.g., a packet network router, an optical switch, etc. may be located within a climate-controlled structure on the ground. In an embodiment, at least a portion of the vehicle data delivery network 706 may be disposed in a non-terrestrial location, e.g., a routing node may be disposed on a satellite or aircraft. The vehicle data delivery network 706 may include a public network, a private network, or some combination of one or more public networks and one or more private networks. The vehicle data delivery network 706 may include a communications network, a data network, a packet network, or some combination thereof. The vehicle data delivery network 706 may include a hosted network, or may be a peer-to-peer or other type of ad-hoc network. Indeed, the vehicle data delivery network 706 may use any known networking technology or combination(s) thereof for delivering data. For example, the vehicle data delivery network 706 may use any known networking technology or combination(s) thereof for delivering data between the one or more structures 712 and the data center 705 or the hybrid communications distributor 704 at the data center 705. Generally, the vehicle data delivery network 706 may include a plurality of computing devices that are communicatively connected. One or more portions of the vehicle data delivery network 706 may be included in the ground based system described in the aforementioned co-pending U.S. patent application Ser. No. 13/675,190 entitled "GROUND SYSTEM FOR VEHICLE DATA DISTRIBUTION," in an embodiment.

The data center 705 may be communicatively connected to the vehicle data delivery network 706, and may include one or more computing devices in communicative connection so that they collectively appear, to other networks and/or computing devices, as a single logical entity. In an embodiment, the data center 705 includes the hybrid communications distributor 704. The data center 705 may be located at least partially in a terrestrial environment, e.g., in one or more stationary buildings or structures. For example, one or more portions of the data center 705 may be included in a ground distribution network, such as the ground distribution network described in aforementioned co-pending U.S. patent application Ser. No. 13/675,190. In an embodiment, at least a portion of the data center 705 may be located in a non-terrestrial environment, e.g., on an aircraft, satellite, or space station. It is clear, however, that the data center 705 may be located in any suitable environment, whether stationary, mobile, in a vehicle, terrestrial, or non-terrestrial. In an embodiment, multiple data centers 705 may be included in the hybrid communications system 700 for servicing different types of data, different customers, different geographical areas, or any other desired or suitable differentiations.

The data center 705, and in particular, the hybrid communications distributor 704 included in the data center 705, may be communicatively connected via one or more gateways 730 to one or more other networks 732. Generally, a gateway 730 may include one or more computing devices in communicative connection, and may serve as a boundary between the hybrid communications system 700 and one or more other networks 732. In some embodiments, at least some of the computing devices included in the gateway 730 may also be included in the data center 705. The one or more other networks 732 in communicative connection with the gateway 730 may include, for example, the Internet, a PSTN (Public Switched Telephone Network), and/or some other public network. Additionally or alternatively, the one or more other networks 732 may include one or more private networks. The one or more networks 732 may include any number of wired and/or wireless networks. Although FIG. 7 illustrates the data center 705 being connected to one other network 732 via one gateway 730, the techniques and principles described herein equally apply to hybrid communications systems 700 having and/or being in communicative connection with any desired number of other networks 732 via any number of gateways 730. In some embodiments of the system 700, the gateway 730 may be omitted.

In an embodiment, the other network 732 may provide data, e.g., via the gateway 730 or via a direct connection, data that is to be delivered to a particular device 718 that is on-board a vehicle 702x. In an example, the other network 732 is the PSTN communicatively connected to a terrestrial, cellular network to which the device 718 is homed, and the data to be delivered to the device 718 is a text message or a voice mail forwarded by the home system. In another example, the other network 732 is communicatively connected, via a gateway 730, to one or more computing devices that host a website which a user of the device 718 requests access, and information associated with the website (e.g., the web page, objects, and links thereon) is to be delivered to the device 718 for presentation on a user interface of the device 718 in response to the user request. In yet another example, the other network 732 is communicatively connected to a streaming media provider, and a streamed video file is the data is to be delivered to the on-board device 718 for consumption by the device's user at a user interface. Of course, any type of data may be provided to the data center 705 by any other network 732 (via the gateway 730, if necessary) for delivery to an indicated device 718 on-board the vehicle 702x, e.g., text messages, web pages, media content, streaming data, a response to a previous request received at a user interface of the device 718, data that is to be presented at a user interface of the device 718, an application, a configuration, or other software that the user of the device 718 has requested to be downloaded from the other network 732. Additionally, return data or information from the on-board device 718 (e.g., an activation of a user control, a return text message, a request or command, etc.) that is received at the hybrid communications distributor 704 may be delivered (via the gateway 730, if necessary) to the other network 732.

Figure 8:
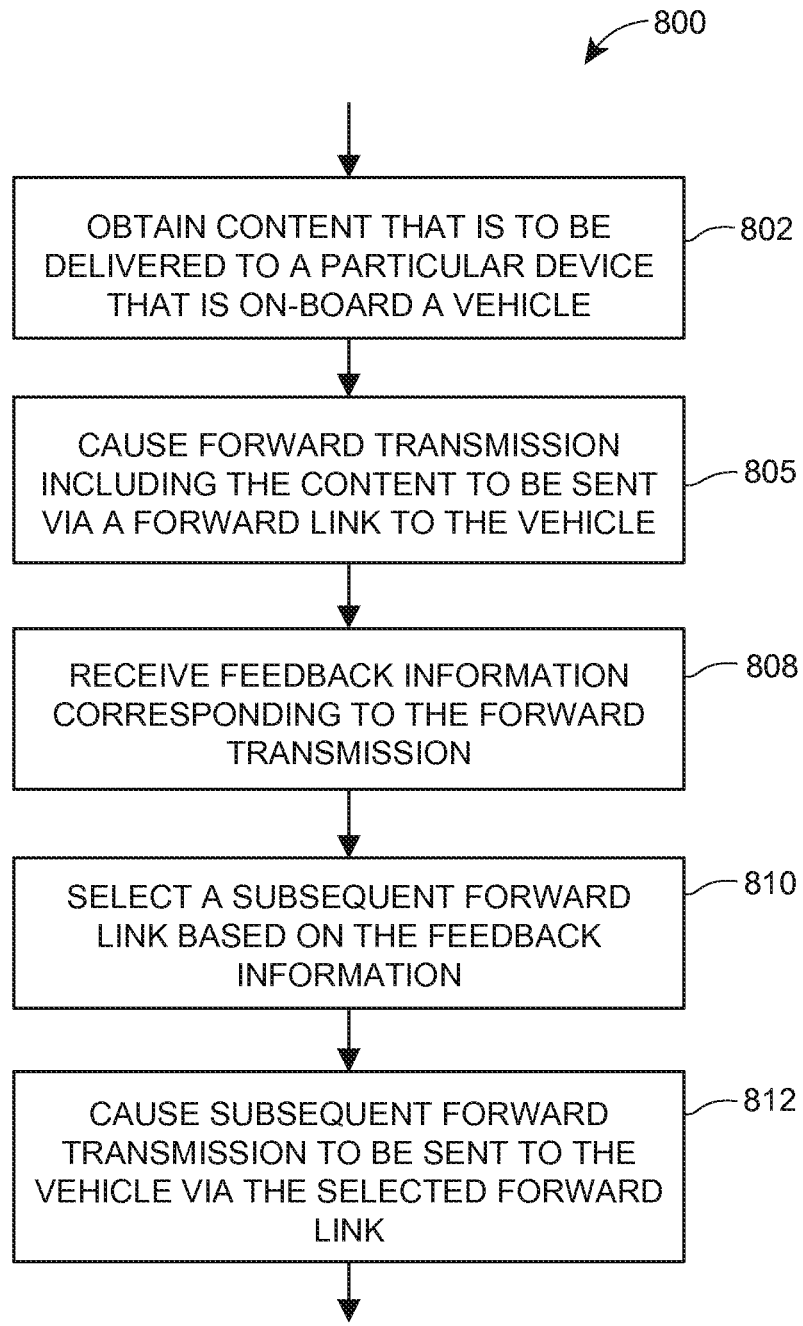
FIG. 8 illustrates an example method of providing hybrid communications to and from devices that are on-board a set of vehicles, in accordance with some embodiments.

FIG. 8 illustrates an example method 800 for providing communications to and from a device being transported by a vehicle. In an embodiment, the method 800 is performed at least in part by the hybrid communications system 700 of FIG. 7, although some or all of the method 800 may be performed by a communications system other than the system 700. In an embodiment, at least a portion of the method 800 may be performed by the data center 705 or by the hybrid communications distributor 704 of the data center 705. For ease of discussion, the method 800 is described below with simultaneous reference to the system 700 of FIG. 7, however, this is only one of many embodiments and is understood to be non-limiting.

As previously discussed, the recipient device of the data or information included in the communications may be a computing device that is fixedly connected to a vehicle (e.g., a device that is included in an LRU on an aircraft), or the device may be a mobile computing device such as a smart phone, tablet or laptop computing device that is temporarily being transported by the vehicle. In fact, the device may be any device connected to any on-board communication network that is communicatively connected to the on-board node via which data is received onto the vehicle and/or delivered from the vehicle. For ease of discussion, though, and not for limitation purposes, the method 800 is described below in the context of an example scenario in which a device 718 is being transported by a particular vehicle 702x.

At block 802, content that is to be delivered to a particular device 718 being transported by a particular vehicle 702x may be received, e.g., from the network 732, the vehicle data delivery network 706, the data center 705, or from any other suitable source. For example, the data center 705 or the hybrid communications distributor 704 of the data center 705 may receive the content that is to be delivered to the device 718. The received content may include any type of data that may be consumed by a user of the device 718, such as text messages, web pages, media content, streaming data, a response to a previous request received at a user interface of the device 718, and/or data that is to be presented at a user interface of the device 718. In some cases, the received content may be an application, a configuration, other software that the user of the device 718 has requested to be downloaded to the device 718, or other data.

In an embodiment, the content is received in conjunction with an indication that the received content is to be specifically delivered only to the device 718. For example, the received content may be received in one or more packets, messages or other communicated format including a destination address that particularly and singularly indicates or identifies the particular device 718. In some cases, the specific device 718 is the only device being transported by the set of vehicles 702 that is to receive the content. Upon reception of the content and the indication of the device 718, the hybrid communications distributor 704 may determine that the device 718 is currently being transported by (e.g., is on-board) the vehicle 702x.

At block 805, a transmission (e.g., a message, packet, or other suitable communication format) may be caused to be sent, via the vehicle data delivery network 706 and a forward link 708, to the vehicle 702x on which the device 718 is being transported. For example, the hybrid communications distributor 704 may cause the forward transmission to be sent to the vehicle 702x. The forward transmission may include at least a portion of the received content and an indication of the device 718 to which the content included in the forward transmission is to be delivered. The forward link 708 may be supported by a first allocated frequency band, e.g., the forward link 708a of an ATG communications band, or the forward link 708b of a satellite communications band. In an embodiment, the forward link 708 may be included in a frequency band allocated for broadband communications.

In an embodiment, the forward transmission may be sent as a multicast transmission, e.g., a transmission that is sent to a plurality of destinations (including the vehicle 702x) in an essentially parallel manner. The forward transmission may be multicast to multiple vehicles 702 even though the content included therein is to be delivered to only the device 718 and not to other devices on-board the vehicle 702x or on-board other vehicles 702. In an embodiment, the hybrid communications distributor 704 may include the content to be delivered to the device 718 and an indication or identifier of the device 718 in the forward transmission, and the hybrid communications distributor 704 may cause the forward transmission to be multicast over a forward link, e.g., the forward link 708b of the satellite communications band. As such, the multicast transmission may be received by the particular vehicle 702x and by one or more other vehicles 702 that have modems tuned to the frequency band over which the forward transmission is multicast. Each vehicle 702 that receives the multicast transmission may individually determine, e.g., based on the indication of the device 718 included in the multicast transmission, whether or not the device 718 to which the contents carried in the multicast transmission is to be delivered is currently on-board. In an embodiment, multiple contents respectively to be delivered to multiple recipient devices on-board multiple vehicles may be multiplexed into a single forward transmission.

At block 808, feedback information or data corresponding to the forward transmission that was sent to the vehicle 702x over the forward link may be received. In an embodiment, the feedback information is received at the hybrid communications distributor 704 via a reverse link supported by a different allocated frequency band than the frequency band supporting the forward link over which the forward transmission was sent. For example, if, at block 805, the forward link over which the forward transmission is sent is the forward link 708b of the satellite communications link, the reverse link at the block 808 over which the feedback information is received may be the ATG reverse link 710a or the Wi-Fi reverse link 710c. In an embodiment, the feedback information is included in a unicast transmission sent over the reverse link. For instance, the unicast transmission may be transmitted from the vehicle 702x via a selected return link 710. The feedback information may then be delivered to the hybrid communications distributor 704, e.g., via the vehicle data delivery network 706 using the unicast transmission format or another format.

The feedback information may include information or data corresponding to the forward transmission (block 802), in an embodiment. For instance, the feedback information may include signaling information corresponding to the forward transmission received at the vehicle 702x over the forward link, e.g., the feedback information may include reverse signaling such as an acknowledgement of a reception of the forward transmission, or an indication that an expected content was not received in the forward transmission. Accordingly, the forward link of one frequency band may serve as a forward data or payload delivery link, and the reverse link of another frequency band may serve as a signaling link corresponding to the forward data or payload delivery link. Such use of forward and reverse links in different frequency bands may allow efficient use of available communication spectrum while adhering to certain hardware/software constraints or regulatory requirements, in some cases.

For example, multiple forward data that is respectively delivered to various devices on board the vehicle 702x or the vehicles 702 may be multiplexed into a single forward transmission over a broadband forward link (e.g., the forward satellite communications link 708b). In an embodiment, multiplexed forward transmissions may be multicast to a plurality of vehicles 702. Reverse signaling corresponding to the forward transmissions may be transmitted from the vehicle 702x (or the vehicles 702) over a lower-bandwidth reverse link (e.g., via the reverse ATG link 710a or the reverse Wi-Fi link 710c) rather than over the corresponding higher bandwidth reverse link (e.g., reverse signaling is not transmitted over the reverse satellite communications link 710b in this example). In some cases, forward signaling corresponding to the payload may be transmitted from the hybrid communications distributor 704 over the lower-bandwidth link (e.g., the forward ATG link 708a or the forward Wi-Fi link 708c).

In some embodiments, the feedback information may include information corresponding to the availability, bandwidth, and/or quality of transmission of the forward link over which the forward transmission was received. For example, the on-board data distribution node 720 may determine the quality of the forward link over which the forward transmission was received based on characteristics of the received forward transmission, such as error correction, delay, and/or whether the contents were expected or not expected. In some cases, the on-board data distribution node 720 may determine the quality of the forward link (and/or the availability or bandwidth of the forward link, for that matter) via other data, such as the strength of signals received over the forward link, information detected by a link monitor, and the like. In a similar manner, the on-board data distribution node 720 may determine the availability, bandwidth, and/or quality of transmission of other forward links 708 and/or of any or all of the reverse links 710.

At block 810, a forward link over which a subsequent transmission is to be delivered to the vehicle 702x (e.g., a "subsequent forward link") may be selected based on the received feedback information. In an embodiment, after the hybrid communications distributor 704 has received the feedback information (block 808), the hybrid communications distributor 704 may select, based on the received feedback information, a subsequent forward link to use for delivery of a subsequent transmission to the vehicle 702x. For example, if the feedback information indicates that a quality of transmission or a bandwidth of one of the forward links has fallen below a threshold, that particular forward link may be removed from the selection pool of forward links, at least until the hybrid communications distributor 704 receives an indication that the quality or bandwidth of the particular forward link has returned to an acceptable level.

In an embodiment, the subsequent forward link may be selected additionally or alternatively based on a type of content that is included in the subsequent forward transmission. For example, a first forward transmission may include a text message that is to be delivered to the device 718, whereas a subsequent forward transmission may include streaming media content that is to be delivered to another device on-board the vehicle 702x. In this example, the hybrid communications distributor 704 may select an ATG forward link 708a to deliver the text message (e.g., if the ATG forward link 708a currently has sufficient spare bandwidth to support the relatively small text message), and the hybrid communications distributor 704 may select the satellite forward link 708b to deliver streaming media content, as the satellite forward link 708b may be a broadband connection link having a greater bandwidth or speed than that of the ATG forward link 708a, which may better support the relatively larger media content. For example, the bandwidth or speed of the satellite forward link 708b may be two times greater than that of the ATG forward link 708a, three times greater, four times greater, five times greater, six times greater, seven times greater, or greater by a factor larger than seven. In some cases, the hybrid communications distributor 704 may select a forward link based on a latency that may be tolerated for the particular content of the subsequent forward transmission. For example, a non-real time media stream such as a video may be buffered for later or delayed delivery to a recipient device.

At block 812, the subsequent forward transmission is caused to be sent to the vehicle 702x using the selected forward link. For example, the subsequent forward transmission may be caused to be sent to the vehicle 702x in a manner such as previously discussed with respect to the block 805.

Any or all of the method 800 may be executed while the vehicle 702x is any state that indicates a dynamic movement of the vehicle 702x, or that indicates that the vehicle 702x is en route or between an origination and a destination. For example, the vehicle 702x may be an aircraft, and at least a portion of the method 800 may be executed while the vehicle 702x is in any one of a plurality of flight states, e.g., in-flight, climbing, descending, weight-on-wheels, or any one of a plurality of possible port states.

With regard to "port states," generally, as used herein, a "port" may be a designated location from which vehicles may depart and at which vehicles may arrive. Examples of ports may include airports, shipping ports, railroad stations, hospitals, shipping terminals, bus terminals, fueling stations, vehicle maintenance or service areas, military bases, aircraft carriers, and the like. As such, a "port state" of a vehicle, as used herein, generally refers to a vehicle state indicating that the vehicle is in the vicinity of (or proximate to) a vehicle port, e.g., the vehicle is taking-off, landing, taxiing, parked, docked, in the harbor, in the freight yard, etc. A port state may indicate that the vehicle is stationary or is not stationary. A port state may be determined, for example, by determining that the vehicle is within a certain distance of a port, e.g., by using a geo-spatial location of the vehicle (e.g., as determined by a Global Positioning System or GPS), and/or by detecting the presence and/or a signal strength of a beacon signal that is transmitted by a transceiver of the port. Of course, vehicles that are not aircraft may nonetheless have the ability to be in a port state, e.g., when a boat is within a harbor or docked at a port, when a truck is at a gas station or weigh station, or any time when a vehicle is not traveling en route between ports.

In an embodiment, the entirety of the method 800 is executed while the vehicle 702x is in a port state. In an embodiment, the entirety of method 800 is executed while the vehicle 702x is in a dynamic movement state (e.g., in-flight, sailing, or moving along a highway). In an embodiment, the entirety of the method 800 is executed while the vehicle 702x is in a stationary state (e.g., parked at a gate, stopped at a rest stop, or halted on a taxi-way).

Figure 9:
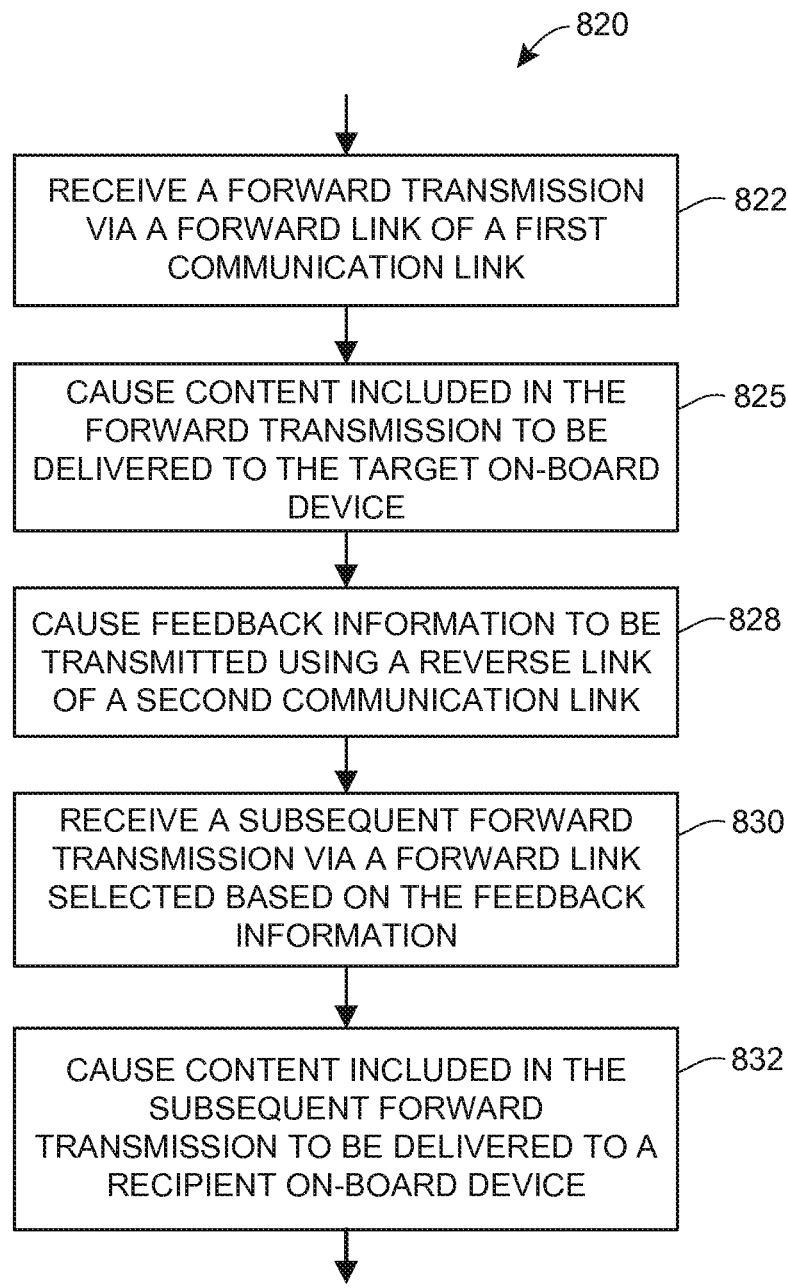
FIG. 9 illustrates an example method of providing hybrid communications to and from devices that are on-board a set of vehicles, in accordance with some embodiments.

FIG. 9 illustrates an example method 820 for providing communications to and from a device being transported by a vehicle. In an embodiment, the method 820 is performed at least in part by the hybrid communications system 700 of FIG. 7, although some or all of the method 820 may be performed by a communications system other than the system 700. In an embodiment, at least a portion of the method 820 is performed by the hybrid communications collector 722 included in the on-board node 720. In an embodiment, the method 820 may operate in conjunction with a least a part of the method 800 of FIG. 8. For ease of discussion, the method 820 is described below with simultaneous reference to the system 700 of FIG. 7 and the method 800 of FIG. 8, however, this description is only one of many embodiments and is understood to be non-limiting.

As previously discussed, the recipient device of the information or data included in communications received at the vehicle may be any device that is communicatively connected with any on-board communication network that, in turn, is communicatively connected to the on-board node via which the communications are received onto the vehicle. For ease of discussion only and not for limitation purposes, the method 820 is described below in the context of an example scenario in which the device 718 is a mobile computing device being transported by a particular vehicle 702x.

At block 822, a forward transmission including content that is to be delivered to the mobile device 718 on-board the vehicle 702x is received at the vehicle 702x. For example, the hybrid communications collector 722 of the on-board node 720 may receive a forward transmission including content that is to be delivered to the device 718. In an embodiment, the content is to be delivered only to the device 718, and not to any other device on-board the vehicle 702x. The content may include data that is to be presented at a user interface of the device 718, data that is to be stored at or executed by the device 718, or any other data that is to be utilized by the device 718 or by a user of the device 718, such as previously discussed.

The forward transmission may be received (block 822) over one of a plurality of forward links to the vehicle 702x and its respective modem that is fixedly connected to the vehicle 702x. The forward link over which the forward transmission is received may be supported by a first allocated frequency band, e.g., the forward link 708b of the satellite communications band.

In an embodiment, the forward transmission may be received at the vehicle 702x (block 822) as a multicast transmission. The multicast transmission may include the content to be delivered to the device 718 and an indication or identifier of the target or recipient device 718. In an embodiment, the content and the indication of the target device 718 may be multiplexed, in the multicast transmission, with other content that is intended to be delivered to the target device 718 or to other target devices on-board any of the vehicles 702. At the particular vehicle 702x, the hybrid communications collector 722 may recover the content and the indication of the content's target device 718 after de-multiplexing the multicast transmission, or after using some other suitable technique to extract the desired information from the forward transmission.

Based on the indication of the device 718 included in the forward transmission, the hybrid communications collector 722 may determine whether or not the device 718 to which the content is to be delivered is currently on-board the vehicle 702x. If the device to which the content is to be delivered is determined to be not on-board the vehicle 702x, no further processing on the received forward transmission may be performed. If the device to which the content is to be delivered is determined to be on-board the vehicle 702x, e.g., the device 718, the method 820 may include causing the content of the received transmission to be sent to the recipient or target device 718 via one or more communication networks contained within the vehicle 702x (block 825). For example, if the device 718 is a mobile computing device connected to a Wi-Fi network on-board the vehicle 702x, the hybrid communications collector 722 may include the content in an IEEE 802.11 compatible transmission, and may cause the transmission to be delivered over the on-board Wi-Fi network to the device 718. Other examples of on-board data delivery other than Wi-Fi, though, are additionally or alternatively possible. Indeed, the method 820 may use any means and/or techniques of delivering, within the vehicle 702x, the received content to an on-board device, such as any of the means and/or techniques described in the aforementioned co-pending U.S. patent application Ser. No. 13/675,200.

At block 828, feedback information may be caused to be transmitted from the vehicle 702x. In an embodiment, the feedback information may be transmitted from the vehicle 702x using a reverse link that is supported by a different allocated frequency band than the frequency band supporting the forward link over which the forward transmission was received (block 822). For example, if the forward link (block 822) is the forward link 708b of the satellite communications link, the reverse link over which the feedback information is transmitted (block 828) may be the ATG reverse link 710a or the Wi-Fi reverse link 710c. In an embodiment, the feedback information is included in a unicast transmission sent over the reverse link. For instance, the hybrid communications collector 722 may cause the unicast transmission may be transmitted from the vehicle 702x via the selected return link 710.

As previously discussed with respect to FIG. 8, the feedback information may include information or data corresponding to the received forward transmission (block 822) or to other received forward transmissions, information or data corresponding to the forward link over which the forward transmission (block 822) was delivered to the vehicle 702x, information or data corresponding to other forward links, and/or information or data corresponding to one or more reverse links. For example, the feedback information may include reverse signaling information corresponding to the forward transmission received at the vehicle 702x over the forward link (block 822), e.g., the feedback information may include an acknowledgement of a reception of the forward transmission, or that an expected content was not received in the forward transmission. As such, in this example, the vehicle 702x may utilize the forward link of one frequency band as a forward data or payload delivery link, and may utilize the reverse link of another frequency band as a signaling link corresponding to the forward data or payload delivery link.

In an embodiment, the vehicle 702x may utilize the forward link (e.g., the forward link of block 822) as a unidirectional communication link. For example, the vehicle 702x may cause the transceiver or the modem that is connected to the communications link including the forward link to operate in a receive-only mode. The vehicle 702x may utilize the second communication link as a reverse link corresponding to the unidirectional forward link (e.g., the reverse link of block 828). The vehicle 702x may utilize the second communication link as a unidirectional link (e.g., by placing the transceiver or modem connected to the second communication link in a transmit-only mode), or the vehicle 702x may utilize the second communication link as a bi-directional link (e.g., by allowing the transceiver or modem connected to the second communication link to be used in both receive and transmit modes).

It is noted that the vehicle 702x may utilize numerous different configurations and numbers of first and second communication links to realize the hybrid communication techniques discussed herein, e.g., techniques in which communications are delivered to and from devices on-board a vehicle using forward and reverse links of different communications frequency bands. For example, at least some of the techniques described herein may be realized by using one or more full duplex (e.g., bi-directional) communication links as a logical forward link, and by using one or more other full duplex communication links supported by one or more frequency bands different than the frequency band(s) of the logical forward link as a corresponding logical reverse link. In another example, at least some of the techniques described herein may be realized using one or more uni-directional communication links as the logical forward link, and using one or more other uni-directional communication links supported by one or more frequency bands different than the frequency band(s) of the logical forward link as a corresponding logical reverse link. In yet another example, one or more full-duplex communications links may be used as the logical forward link, and one or more uni-directional communications links supported by one or more frequency bands different than the frequency band(s) of the logical forward link are used as a corresponding logical reverse link. In still another example, one or more uni-directional communications links may be used as the logical forward link, and one or more full-duplex communications links supported by one or more frequency bands different than the frequency band(s) of the logical forward link are used a corresponding logical reverse link.

At block 830, a subsequent forward transmission may be received at the vehicle 702x. The subsequent forward transmission may include additional content that is to be delivered to the device 718, or the subsequent forward transmission may include content that is to be delivered to other devices on-board the vehicle 702x or on-board other vehicles 702. The subsequent forward transmission may be received over one of a plurality of forward links to the vehicle 702x, and the forward link over which the subsequent forward transmission is received may have been selected based on the feedback information previously transmitted from the vehicle 702x (block 828), and/or may have been selected based on a type of the additional content. As such, the forward link of block 830 may be the same forward link of block 822, or may be a different forward link.

The hybrid communications collector 722 may determine whether or not the device to which the content of the subsequent forward transmission is to be delivered is currently on-board the vehicle 702x, e.g., in a similar manner as discussed above with respect to block 825. If the device to which the content is to be delivered is determined to be not on-board the vehicle 702x, no further processing on the subsequent transmission may be performed. If the device to which the content is to be delivered is on-board the vehicle 702x, e.g., the device 718, the method 820 may include causing the content of the received subsequent transmission to be sent to the recipient or target device 718 via one or more communication networks contained within the vehicle 702x (block 832), e.g., in a manner similar to that discussed above with respect to the block 825.

In an embodiment, after the block 832, the method 820 may include causing subsequent feedback information to be sent from the vehicle 702x (not shown). The subsequent feedback information may include data or information corresponding to the subsequent forward transmission, to the forward link over which the subsequent forward transmission was delivered to the vehicle 702x, to other forward links, and/or to one or more reverse links. For example, the hybrid communications collector 722 may cause the subsequent feedback information to be transmitted from the vehicle 702x using a selected reverse link for delivery to the hybrid communications distributor 704 in a manner similar to that discussed with respect to block 828. The hybrid communications distributor 704 may then utilize the subsequent feedback information to select a next forward link, in an embodiment.

Similar to the method 800, any or all portions of the method 820 may be executed while the vehicle 702x is any state that indicates a dynamic movement of the vehicle 702x, such as a flight state or a state indicating that the vehicle 702x is traveling between ports. Any or all of the method 820 may be executed while the vehicle 702x is any port state. Any or all of the method 820 may be executed while the vehicle 702x is in stationary state (e.g., parked at the gate, docked at a port, or halted on a taxi-way).

Figure 10:
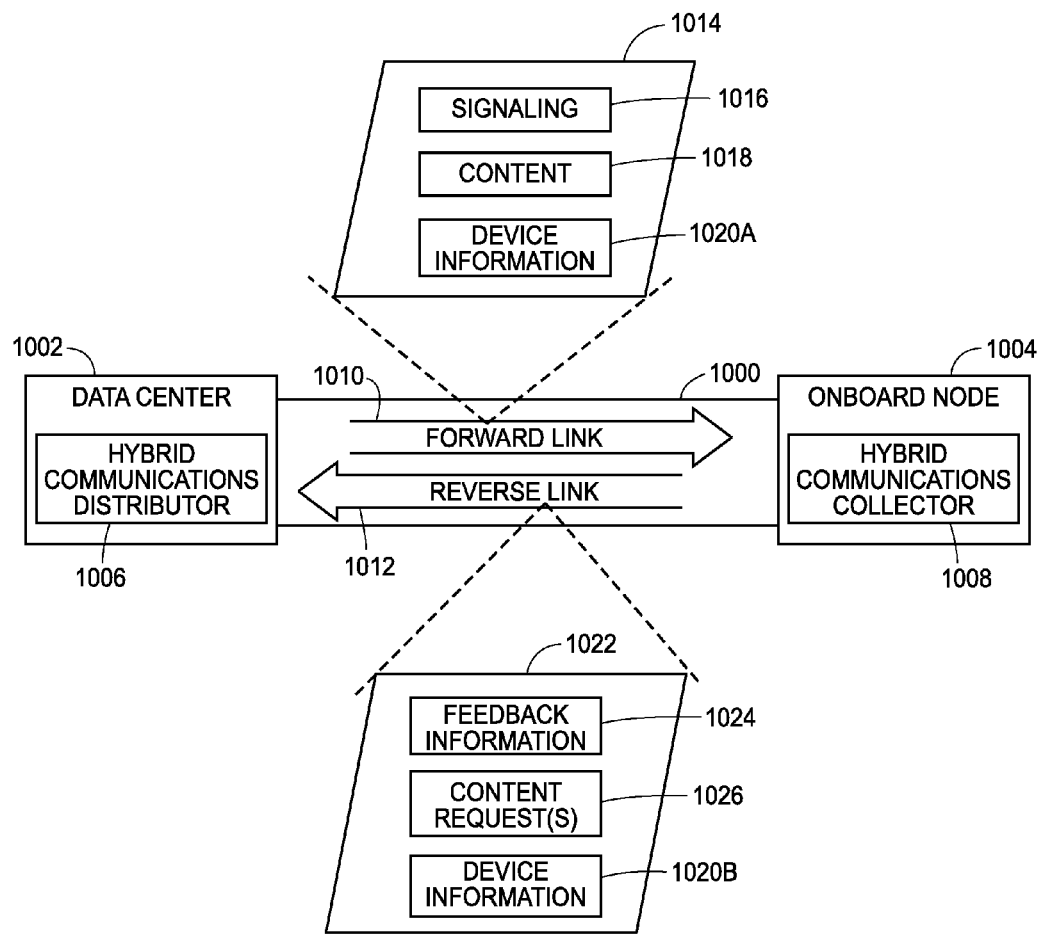
FIG. 10 includes an example block diagram of a data communication tunnel established in a hybrid communications system, in accordance with some embodiments.

A block diagram of an example data communication tunnel 1000 that may be established in the hybrid communications system 700 or in another hybrid communications system is provided in FIG. 10. As used herein, the terms "data communication tunnel," "data tunnel," and "tunnel" are used interchangeably to refer to an encapsulated transmission path or logical connection, e.g., between a node or data center 1002 that is external to the vehicle 702x, and a node 1004 that is on-board the vehicle 702x. In some cases, the data communication tunnel 1000 may be an encapsulated transmission path or logical connection having a first endpoint that is external to the vehicle 702x. For example, the first endpoint of the data tunnel may be the data center 1002 or may be a hybrid communications distributor 1006 at the data center 1002. In an embodiment, the hybrid communications distributor 1006 may be the hybrid communications distributor 704 of FIG. 7.

The data communication tunnel 1000 may have a second endpoint that is disposed on-board the vehicle 702x. For example, the second endpoint of the data tunnel 1000 may be the on-board node 1004, or may be an application 1008 executing on the on-board node 1004, such as the hybrid communications collector 722 executing on the on-board node 720. In some cases, the second endpoint of the data tunnel 1000 may be the recipient device 718, or may be the VTA or some other application executing on the recipient device 718.

The data tunnel 1000 may be realized, in an embodiment, by utilizing a tunneling protocol between the two endpoints. The packets or transmissions of the tunneling protocol may be encapsulated within packets or transmissions of other protocol(s) used by communication link(s) supporting the tunnel 1000. As an example, referring simultaneously to FIGS. 7 and 10, an example data tunnel between the hybrid communications distributor 704 and the device 718 on-board the vehicle 702x may include a data tunnel forward link 1010 that uses a data tunnel protocol. Forward packets of the data tunnel protocol may be encapsulated by each of the respective protocols used by the various forward links supporting the data tunnel forward link 1010 e.g., respective protocols used by the vehicle data delivery network 706, a selected forward link 708, and the Wi-Fi forward link within the cabin of the vehicle 702x. Similarly, a data tunnel reverse link 1012 between the hybrid communications distributor 704 and the device 718 may be supported by a Wi-Fi reverse link within the cabin of the vehicle 702x, a selected reverse link 710, and the vehicle data delivery network 706, e.g., each of the respective protocols utilized on these various supporting reverse links encapsulates the data tunnel protocol packets in the reverse direction.

In embodiments where the data tunnel 1000 is included in the hybrid communications system 700, the data tunnel forward link 1010 may be supported by one or more communication links that differ in protocol and/or frequency band from the one or more communication links supporting the data tunnel reverse link 1012. Further, the data tunnel forward link 1010 and the data tunnel reverse link 1012 may differ in their respective supporting message delivery schemes (e.g., multicast or unicast), and/or in the number of supporting communication links used (e.g., multiple supporting communication links in the data tunnel forward link 1010 and one supporting communication link in the data tunnel reverse link 1012). Nonetheless, the data tunnel 1000 between the data center 1002 and on-board node 1004 may be, in some cases, logically represented (e.g., in a software application) as having one logical data tunnel forward link 1010 or forward stream of data, and one logical data tunnel reverse link 1012 or reverse stream of data, in an embodiment.

Forward data 1014, or data sent on the data tunnel forward link 1010 to the on-board node 1004, may include, for example: (i) content 1018 for delivery to one or more on-board recipient devices that are in communicative connection to the on-board node 1004, where the content 1018 may include any type of data, such as text messages, web pages, media content, streaming data, a response to a previous request received at a user interface of an on-board device, data that is to be presented at a user interface of an on-board device, an application, a configuration, other software that the user of an on-board device has requested to be downloaded, etc.; (ii) signaling information 1016 corresponding to the content 1018 and to the delivery of the content 1018 over the data tunnel 1000; (iii) device information 1020a identifying the on-board recipient device or devices to which the content 1018 is to be delivered; and/or (iv) other forward signaling information 1016 corresponding to usage of the data tunnel 1000 itself (e.g., availability, quality of transmission, bandwidth management, etc.).

Reverse data 1022, or data sent on the data tunnel reverse link 1012 to the data center 1002, may include, for example: (i) feedback information 1024 corresponding to the delivered content 1018 and/or corresponding to the usage of data tunnel 1000 (e.g., availability, quality of transmission, bandwidth management, etc.); (ii) content requests 1026 from on-board devices, where the content requests 1026 are generated by a user of an on-board device or by the on-board device itself; and/or (iii) device information 1020b identifying the on-board devices generating the content requests 1026.

Although several specific examples of forward data 1014 and reverse data 1022 are discussed above, it is understood that the data tunnel forward link 1010 and the data tunnel reverse link 1012 may carry any desired type of data between the endpoints of the tunnel 1000. Additionally, it is clear that the forward data 1014 may be split, aggregated, multiplexed, or combined into any number of data structures, packets, or messages, e.g., for the sake of efficiency and timeliness. Similarly, the reverse data 1022 may additionally or alternatively be split, aggregated, multiplexed, or combined into any number of data structures, packets, or messages. Furthermore, in an embodiment, multiple data tunnels may be established between the two endpoints. For example, the data center 1002 or the hybrid communications distributor 1006 included therein may establish multiple data communication tunnels with the node 1004 on the particular vehicle 702x, and/or may establish multiple data communication tunnels with multiple nodes on multiple vehicles 702.

Figure 11:
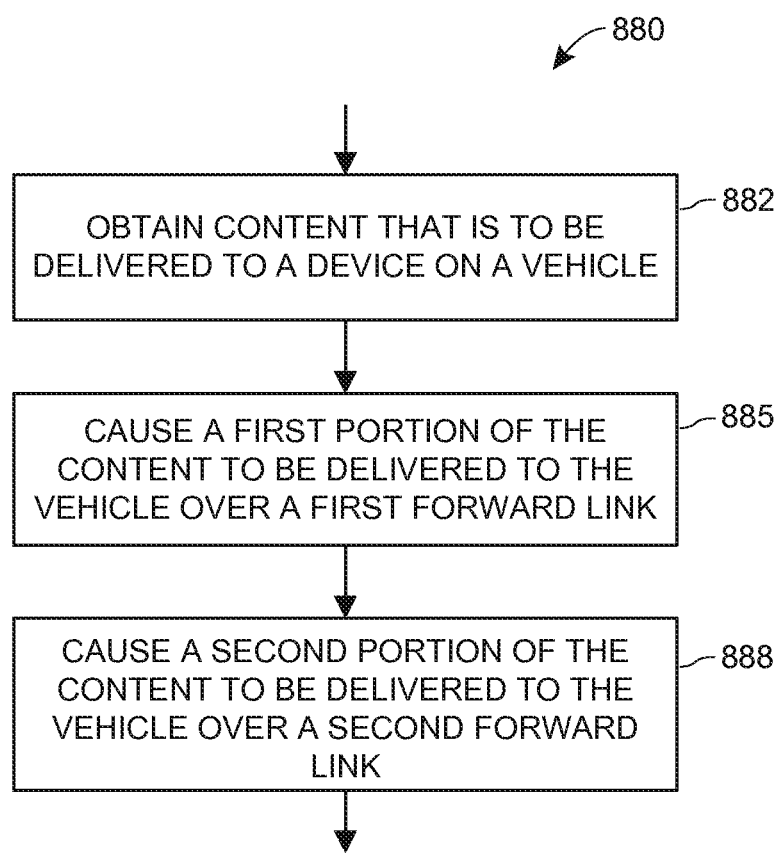
FIG. 11 illustrates an example method for delivering content in a distributed or hybrid manner to devices being transported by vehicles, in accordance with some embodiments.

FIG. 11 illustrates an example method 880 for delivering content, in a distributed or hybrid manner, to a device that is on-board a vehicle. In an embodiment, the method 880 is performed at least in part by the hybrid communications system 700 of FIG. 7, although some or all of the method 880 may be performed by a communications system other than the system 700. In an embodiment, at least a portion of the method 880 is performed by the data center 705 or by the hybrid communications distributor 704 included in the data center 705. In an embodiment, the method 880 may operate in conjunction with a least a part of one or more of the methods described in FIGS. 8 and 9, and/or with the data tunnel 1000 of FIG. 10. For ease of discussion, the method 880 is described below with simultaneous reference to FIGS. 7-10, however, this description is only one of many embodiments and is understood to be non-limiting. Additionally, for ease of discussion only and not for limitation purposes, the method 880 is described below in the context of an example scenario in which data is to be delivered to a device 718 that is on-board a particular vehicle 702x of a plurality of vehicles 702.

At block 882, content that is to be delivered to a device 718 being transported by a vehicle 702x may be obtained. For example, content that is to be delivered to the device 718 may be obtained by the data center 705 or by the hybrid communications distributor 704 of the data center 705, e.g., by receiving the content from an external network 732, the vehicle data delivery network 706, or other suitable source, or from obtaining the content from the data center 705 itself or from some other data storage entity. The device 718 to which the content is to be delivered may be any device previously discussed with respect to FIGS. 7-10, e.g., a mobile computing device being temporarily transported by the vehicle 702x, or a computing device that is fixedly connected to the vehicle 702x. Similarly, the content to be delivered to the device 718 may be any type of content previously discussed with respect to FIGS. 7-10, e.g., a web page, streaming data, a text message, a response to a previous request, etc. With respect to the method 880, though, the content to be delivered to the device 718 is to be delivered to the device 718 as a whole, e.g., an entire web page, a streaming video or movie, etc. In embodiment, the obtained content is to be delivered to the device 718 as a whole to be presented, as a whole, at a user interface of the device 718.

At block 885, a first portion of the obtained data may be included in a first transmission, and the first transmission may be caused to be sent via a first forward link to the vehicle 702x. At block 888, a second portion of the obtained data may be included in the second transmission, and the second transmission may be caused to be sent via a second forward link to the vehicle 702x. The first forward link and the second forward link may each be supported by a different communication link on a different frequency band, and thus the first transmission and the second transmission may each be formatted using a different protocol. For example, a first portion of the obtained data may be caused to be sent to the vehicle 702x over the satellite forward link 708b, and a second portion of the obtained data may be caused to be sent to the vehicle 702x over the ATG forward link 708a. In an embodiment, the bandwidth or speed of the first forward link may be two times greater than that of the second forward link, three times greater, four times greater, five times greater, six times greater, seven times greater, or greater by a factor larger than seven.

In some embodiments of the method 880, at least one of the contents of the first portion of the obtained data or the contents of the second portion of the obtained data may be selected. In an embodiment, the contents of the first or the second portion may be selected based on a content type. For example, if the obtained content is a web page to be displayed at a screen of the target device 718, for an optimal user experience, a user desires to see some progress of the loading of the web page. Accordingly, critical elements of the web page (e.g., CSS, HTML, Java script, and other structural elements) may be selected to be delivered to the vehicle 702x by a faster forward link (e.g., the ATG forward link 708a) so that these critical elements may be received as soon as possible at the device 718 to begin establishing the web page framework, and to demonstrate to the user that some progress is occurring. On the other hand, larger-sized elements of the web page (e.g., image, video, flash, etc.) may arrive at the user device after the critical elements, and may be inserted into the already-established webpage framework. These larger elements, although not as time-critical to the user experience, nonetheless require high bandwidth due to their size and density and, as such, may be selected to be delivered to the vehicle 702x by a high-bandwidth forward link (e.g., the satellite forward link 708b).

Generally, the more time sensitive portions (e.g., portions that require a low round trip delay time) of an obtained content may be selected to be delivered over a faster forward link (as compared to other available forward links 708), the higher density or larger-sized portions of the obtained content may be selected to be delivered over a higher capacity forward link (as compared to other available forward links 708), the portions of the obtained content that require a greater degree of accuracy may be selected to be delivered over a more robust forward link (as compared to other available forward links 708), etc. In some situations, a particular content type may be exclusively assigned to one particular type of forward link for delivery, and optionally may be assigned to a back-up type of forward link if the primary forward link is unavailable. In some situations, a particular content type may be assigned to multiple types of forward links, optionally with a priority order of selection, e.g., the highest priority, available forward link is selected for delivery of the certain content type.

In still another example, within a given forward link, certain types of data may be given priority over other types of data. For instance, in a satellite forward link, overflow data from an ATG forward link may be given higher priority than data that has been originally mapped to the satellite forward link, as the overflow ATG traffic may generally be more time sensitive than the satellite traffic.

In some embodiments of the method 880, a particular forward link may be selected for a particular type of content data further based on other criteria, such a dynamic characteristic or status of one or more forward links, or on a characteristic of the obtained content as a whole. For example, when the obtained content is a streaming video, streaming media coded picture frames (e.g., I-frames) may be assigned or selected to be delivered over the ATG forward link 708a, while the corresponding streaming media predictive frames (e.g., P-frames, B-frames) may be assigned or selected to be delivered over a $K_a$ satellite frequency band. However, the bandwidth allocated for any particular stream within the $K_a$ band may be capped at a certain level. If the streaming media content reaches the cap within the $K_a$ band, subsequent predictive frames of the stream may be delivered via another forward link, e.g., the L satellite frequency band. In another example, a particular type of content data may be assigned or selected to be delivered over an ATG forward link 708a, and when the ATG forward link is at a pre-defined capacity, overflow of the particular type of content data may be assigned or selected to be delivered over the satellite forward link 708b. In another example, any data stream greater than a certain size may be automatically mapped to be distributively delivered over all available satellite forward links.

In an embodiment, the selection of a particular forward link may be based, at least in part, based on feedback data or information received from the vehicle 702x. Feedback information or data may be indicative of a current quality, capacity, or availability of one or more forward links, e.g., as previously described with respect to FIGS. 8-10. The data center 705 or the hybrid communications distributor 704 may receive feedback data or information via a reverse link, and may select a subsequent forward link for transmission of a particular portion of obtained content at least partially based on the received feedback information or data, in an embodiment.

Thus, as illustrated by the examples, portions of the content data may be mapped to various forward links based on many levels of granularity and differentiation criteria. For example, as previously indicated, mapping of different portions of content data to different forward links may be based on content type. Mapping may additionally or alternatively be based on a type of application to which the obtained content is to be delivered, and/or based on a stream size in which the obtained content is included. Still additionally or alternatively, mapping of portions of the obtained content to various forward links may be based on, for example, socket types or availability of sockets, a level of service paid for by or otherwise assigned to a user of the recipient device, a quality and/or an availability of various forward links, dynamic resource allocation algorithms, etc. Further, mapping of portions of the obtained content to various forward links may be additionally or alternatively performed at different levels, e.g., at an application level, a packet level, a stream level, a level based on geographical location, a level based on a characteristic of an account of the user, or a level of service acquired by the user.

In an embodiment, the mapping of certain content types to certain forward links are determined a priori and the mappings are stored in a file or other data storage entity that is accessible to the data center 705 or to the hybrid communications distributor 704. In some embodiments, a particular forward link may be selected for a particular type of data content based on the a priori mapping. The mappings of content portions and forward links may be configurable, in an embodiment.

With further regard to the method 880, similar to the each of the methods 800 and 820, any of the forward transmissions over any of the forward links 708 may include multiplexed contents or portions of contents that are to be delivered to the device 718 and/or to other devices being transported on the vehicles 702. Similarly, each of the methods 800, 820, 880 may multicast any forward transmission over any forward link 708, as desired.

Figure 12:
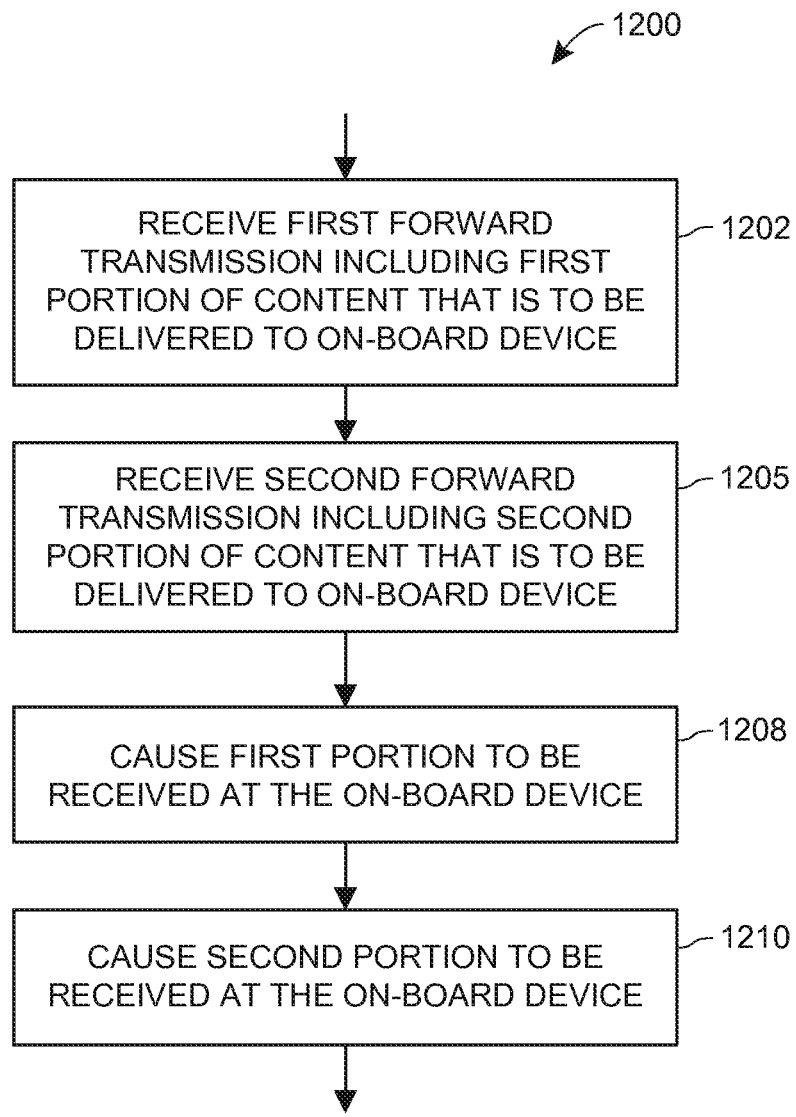
FIG. 12 illustrates an embodiment of a method for delivering content in a distributed or hybrid manner to a device that is on-board a vehicle, in accordance with some embodiments.

FIG. 12 illustrates an example method 1200 for distributively delivering content to devices being transported by vehicles. In an embodiment, the method 1200 is performed at least in part by the hybrid communications system 700 of FIG. 7, although some or all of the method 1200 may be performed by a communications system other than the system 700. In an embodiment, at least a portion of the method 1200 is performed by the on-board node 720 at the vehicle 702x, by the hybrid communications collector 722 included in the on-board node 720, by a recipient device 718, or by an application executing on the recipient device 718 such as the VTA. In an embodiment, the method 1200 may operate in conjunction with at least a part of one or more of the methods described in FIGS. 2-5 and 7, and/or with the data tunnel 600 of FIG. 6. For ease of discussion, the method 1200 is described below with simultaneous reference to FIGS. 7-11, however, this description is only one of many embodiments and is understood to be non-limiting. Additionally, for ease of discussion only and not for limitation purposes, the method 1200 is described below in the context of an example scenario in which data is to be delivered to a device 718 that is on-board a particular vehicle 702x of a plurality of vehicles 702.

At block 1202, a first transmission including a first portion of content that is to be received, as a whole by the on-board device 718, is received at the vehicle 702x. For example, the on-board node 720, the hybrid communications collector 722, the device 718 or an application on the device 718 (e.g., the VTA) receives the first portion of the content. In an embodiment, the content that is to be received, as a whole by the device 718, is to be presented, as a whole, at a user interface of the device 718. For example, the content that is to be presented as a whole at the user interface of the device 718 may be a web page, streaming video, a response to a request from a user of the device 718, or any other type of content that is to be delivered to the device 718 such as previously discussed with respect to FIGS. 7-11. The first portion of the content may be received onto the vehicle 702x via a first modem connected to a first forward link (e.g., one of the forward links 708) that is supported by a first wireless frequency band, and the first portion of the content may be received in conjunction with an indication of the device 718 to which the first portion of the content is to be delivered.

At block 1205, a second transmission including a second portion of content that is to be received, as a whole by the on-board device 718, is received at the vehicle 702*x*. For example, the on-board node 720, the hybrid communications collector 722, the device 718 or an application on the device 718 (e.g., the VTA) receives the second portion of the content. The second portion of the content may be received onto the vehicle 702*x* via a second modem connected to a second forward link (e.g., another forward link from the set of forward links 708) that is supported by a second wireless frequency band different than the first wireless frequency band. The second portion of the content may be received in conjunction with an indication of the device 718 to which the second portion of the content is to be delivered.

In an embodiment, the first forward link, the second forward link, the first portion of the content, and/or the second portion of the content may have been selected. For example, the first forward link, the second forward link, the first portion of the content, and/or the second portion of the content may have been selected by the data center 705 or by the hybrid communications distributor 704 based on the criteria for forward link and/or content portion selection as previously described herein, or based on other criteria.

In an embodiment, based on the indication of the device 718 included in the first forward transmission, the hybrid communications collector 722 may determine whether or not the device 718 to which the first portion of the content is to be delivered is currently on-board the vehicle 702*x*. If the device to which the first portion of the content is to be delivered is determined to be not on-board the vehicle 702*x*, no further processing on the first forward transmission may be performed at the vehicle 702*x*. If the device to which the first portion of the content is to be delivered is determined to be on-board the vehicle 702*x*, e.g., the device 718, the method 1200 may include causing the content of the first received transmission to be sent to the recipient or target device 718 via one or more communication networks contained within the vehicle 702*x* (block 1208). For example, if the device 718 is a mobile computing device connected to a Wi-Fi network on-board the vehicle 702*x*, the hybrid communications collector 722 may include the first portion of the content in an IEEE 802.11 compatible transmission, and may cause the transmission to be delivered over the on-board Wi-Fi network to the device 718. Other examples of on-board data delivery other than Wi-Fi, though, are additionally or alternatively possible. Indeed, the method 1200 may use any means and/or techniques of delivering the received content to an on-board device, such as any of the means and/or techniques described in the aforementioned co-pending U.S. patent application Ser. No. 13/675,200.

With regard to the second forward transmission, in an embodiment, based on the indication of the device 718 included in the second forward transmission, the hybrid communications collector 722 may determine whether or not the device 718 to which the second portion of the content is to be delivered is currently on-board the vehicle 702*x*. If the device to which the second portion of the content is to be delivered is determined to be not on-board the vehicle 702*x*, no further processing on the second forward transmission may be performed at the vehicle 702*x*. If the device to which the second portion of the content is to be delivered is determined to be on-board the vehicle 702*x*, e.g., the device 718, the method 1200 may include causing the content of the second received transmission to be sent to the recipient or target device 718 via one or more communication networks contained within the vehicle 702*x* (block 1210). For example, if the device 718 is a mobile computing device connected to a Wi-Fi network on-board the vehicle 702*x*, the hybrid communications collector 722 may include the second portion of the content in an IEEE 802.11 compatible transmission, and may cause the transmission to be delivered over the on-board Wi-Fi network to the device 718. Other examples of on-board data delivery other than Wi-Fi, though, are additionally or alternatively possible. Indeed, the method 1200 may use any means and/or techniques of delivering the received content to an on-board device, such as any of the means and/or techniques described in the aforementioned co-pending U.S. patent application Ser. No. 13/675,200.

In an embodiment, the first external forward link 708 and the forward link of the on-board communication network to which the device 718 is connected (e.g., the on-board Wi-Fi network or other suitable network) support a first data communication tunnel established by the data center 705 (or by the hybrid communications distributor 704 included in the data center 705). For example, the first forward link and the forward link of the on-board Wi-Fi network to the device 718 support a first data tunnel forward link similar to the data tunnel forward link 1010 of FIG. 10, and the first portion of the content is delivered to the device 718 using the first data tunnel forward link.

In an embodiment, the second external forward link 708 and the on-board forward link to which the device 718 is connected (e.g., the on-board Wi-Fi network or other suitable network) support a second data communication tunnel established by the data center 705 (or by the hybrid communications distributor 704 included in the data center 705) that is distinct and separate from the first data communication tunnel. For example, the second external forward link 708 and the second on-board forward link to the device 718 support a second data tunnel forward link 1010, and the second portion of the content is delivered to the device 718 using the second data tunnel forward link. In this embodiment, the device 718 or an application at the device 718 (e.g., the VTA) may assemble the first portion and the second portion to form the content as a whole at the device 718, in some cases, over time. For example, the device 718 or the application at the device 718 may first receive the first portion of the content, and begin presenting the first portion of the content at a user interface of the device. When the second portion of the content is received, the device 718 or the application at the device 718 may add the second portion of the content to the presented first portion so that the content as a whole is presented at the user interface of the device.

In an embodiment, rather than the device 718 (or an application thereon) serving as the on-board endpoints of the two established data tunnels to the data center 705, the on-board device 720 or the hybrid communications collector 722 of the on-board device 720 serves as the on-board endpoints of two established data tunnels to the data center 705 (where one of the two established data tunnels delivers the first portion of the content to be delivered to the device 718, and the other one of the two established data tunnels delivers the second portion of the content). In this embodiment, rather than the device 718 (or an application thereon) collecting and assembling the content as a whole, the on-board device 720 or the hybrid communications collector 722 collects and assembles the content as a whole, and causes the assembled content to be delivered to the device 718, e.g., via an on-board communication network.

In an embodiment, the on-board node 720, the hybrid communications collector 722, the device 718, or an application on the device 718 may cause feedback information or data to be sent, via a reverse link 710, from the vehicle 702x to the data center 705. Feedback information or data may correspond to the received first portion of the content and/or to the received second portion of the content, for example. In an embodiment, the feedback information or data may be indicative of a current quality, capacity, or availability of one or more forward links and/or of one or more reverse links, e.g., as previously described with respect to FIGS. 8-11.

Thus, as discussed above, a hybrid communications system, such as the example hybrid communications system 700, may allow transmission of data and information to devices on-board a vehicle using a forward link and a reverse link, each of which may be supported by a different frequency band and each of which may utilize a different communication protocol. The forward link may differ in frequency band, hardware configuration, protocol, spectrum, etc., as compared with the reverse link corresponding to the reverse direction. In an embodiment, the bandwidth and/or the speed of the forward link may be greater than (and in some cases, significantly greater than) the bandwidth and/or the speed of the reverse link to allow for efficient use of spectrum and modem resources, and for decreased data delivery times. In an embodiment, forward transmissions may be multiplexed and/or multicast. Selection of a forward link for a subsequent transmission may be based on feedback information received via the reverse link, and in some cases, may also be based on a type of the content that is to be delivered. In an embodiment, a hybrid communications system, such as the example hybrid communications system 700, may utilize multiple different forward links to deliver content as a whole between a device that is on-board a vehicle and a data center. Selection of portions of contents and/or of the multiple forward links may be based on a content type and optionally other criteria.

Figure 13:
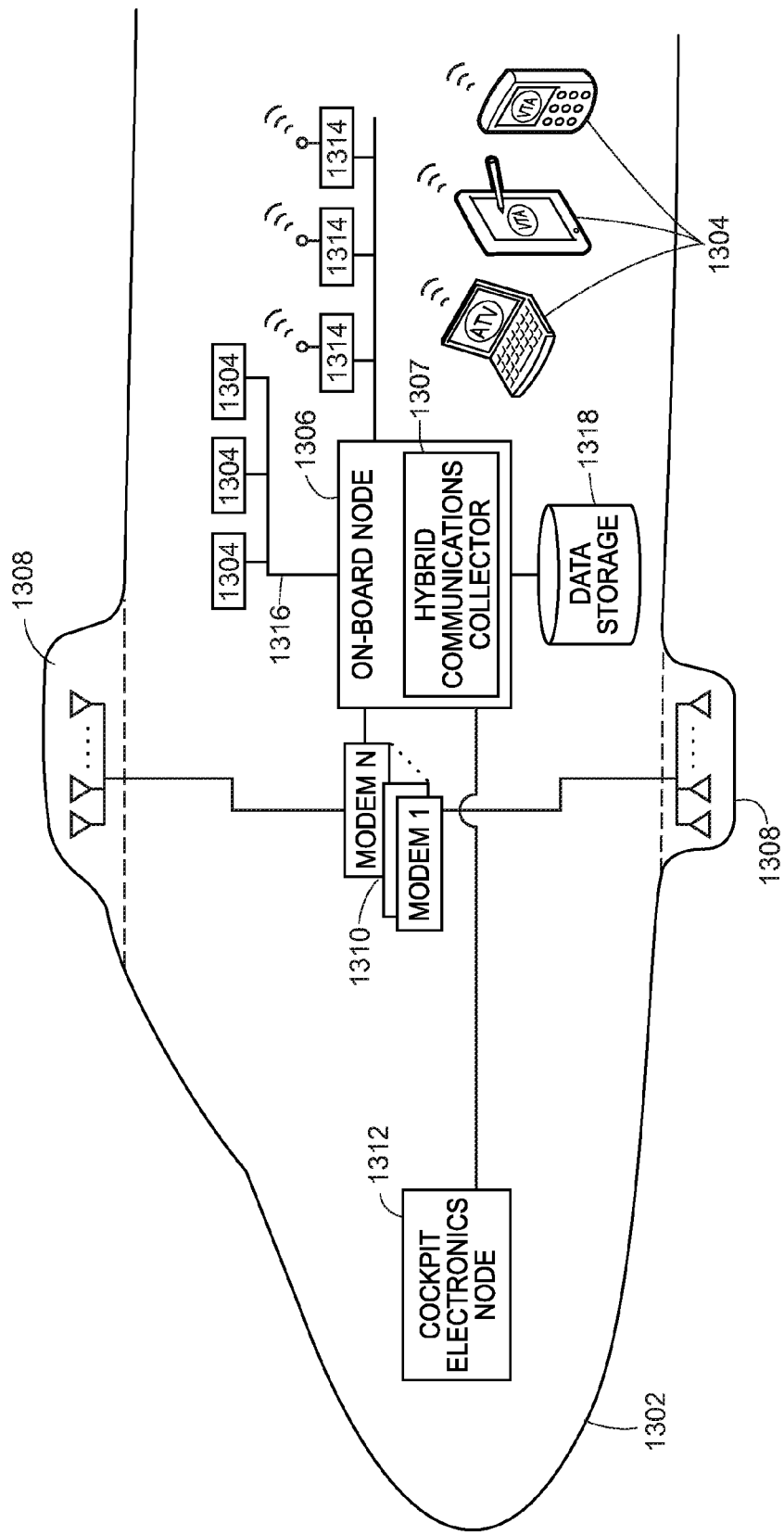
FIG. 13 is a block diagram of an example system contained within a vehicle that is configured to receive hybrid communications or data onto the vehicle and deliver the received information or data to a recipient device that is on-board the vehicle, in accordance with some embodiments.

FIG. 13 illustrates an example on-board system 1300 in a vehicle 1302 that may receive information or data onto the vehicle 1302 (e.g., information or data provided by the data center, the hybrid communications distributor 704, or other suitable information distributor), and that may cause feedback information to be delivered from the vehicle 1302, e.g., to the data center 705 or the hybrid communications distributor 704. Further, the on-board system 1300 may cause data to be delivered to and/or received from one or more devices 1304 being transported by the vehicle 1302. In an embodiment, the vehicle 1302 is the vehicle 702x, and the one or more devices 1304 is one of the devices 718.

The example on-board system 1300 includes an on-board node 1306, such as an Auxiliary Computer Power Unit (ACPU), that may be a computing device communicatively connected to one or more external communication links via one or more antennas 1308 and one or more modems or transceivers 1310. In an embodiment, the on-board node 1306 may be the on-board node 720, and may include an instance of the hybrid communications collector 722, which is represented in FIG. 13 by the block 1307.

Each of the one or more antennas 1308 may receive and transmit signals via a different respective frequency band allocated for wireless communications, e.g., the $K_a$ band, the L band, the $K_u$ band, the WiMAX band, the Wi-Fi band, a terrestrial cellular band, or any other suitable wireless communication frequency band. Each of the antennas 1308 may be communicatively connected to an associated modem or transceiver 1310 that is fixedly connected to the vehicle 1302 and is configured to encode and decode information and data corresponding to signals at the respective antenna 1308, in an implementation. The one or more modems or transceivers 1310 may include a respective modem or transceiver that is compatible with TDMA (Time Division Multiple Access), GSM (Global System for Mobile Communications), CDMA (Code Division Multiple Access), LTE (Long Term Evolution) communications, WiMAX, and/or any other terrestrial mobile communications technology. In some embodiments, the one or more modems 1310 may include a respective modem or transceiver that is compatible with EVDO (Evolution Data Optimized) or Wi-Fi communications technologies. It is clear, however, that the on-board system 1300 may include any number of antennas 1308 and any different number of associated modems or transceivers 1310 to support any desired number of different wireless communication technologies.

In addition, when the vehicle 1302 is an aircraft, a cockpit electronics node 1312 may be communicatively coupled to the one or more modems 1310. The cockpit electronics node 1310 may be a LRU configured to collect electronic information from various instruments in the cockpit of the aircraft, e.g., during flight. In some cases, the cockpit electronics node 1310 may provide collected flight information such as altitude, airspeed, aircraft position, or other flight state information to the hybrid communications obtainer 1307, the on-board node 1306, or directly to the vehicle data distribution network 706, e.g., via a designated return link.

At least some of the devices 1304 may be mobile computing devices such as smartphones, tablet computers, laptop computers, personal digital assistants, e-readers, etc. that are capable of establishing a wireless communicative connection with the hybrid communications obtainer 1307 via one or more wireless access points 1314, e.g., via a wireless network interface. Some of the devices 1304 may be wired computing devices that are communicatively connected to the on-board node 1306 via a wired network 1316.

In some implementations, one or more of the devices 1304 may be an on-board data storage entity 1318 that may store various types of data which may be distributed to and/or received from other devices 1304, e.g., entertainment content, web pages, account information, usage data, applications that may be installed, information identifying the devices 1304, payment information (e.g., encrypted financial account information), digital rights management (DRM) keys, and/or any other data that is desired to be stored, at least temporarily, on-board the vehicle 1302.

In an embodiment, each of devices 1304 may include an instance of a vehicle travel application (VTA) installed thereon and particularly configured to support services while the device 1304 is being transported by the vehicle 1302, e.g., when the vehicle 1302 is traveling en route between ports. For example, the vehicle travel application may be configured to serve as the on-board end of a data tunnel that is established with the data center 705 or with the hybrid communications distributor 704 at the data center. In an embodiment, the vehicle travel application may communicate with other applications installed on a particular device 1304 (e.g., native terrestrial applications) so that the other applications may operate as desired (e.g., in a native manner) while the device 1304 is being transported by the vehicle 1302.

Figure 14:
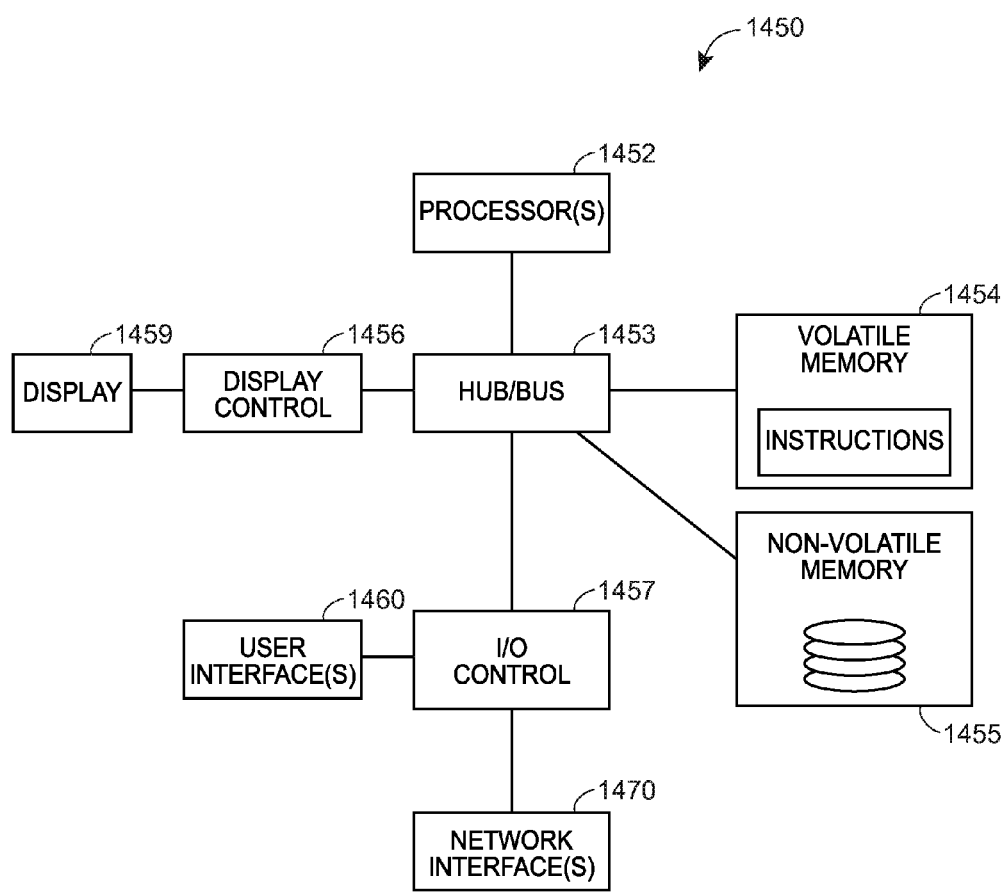
FIG. 14 is a block diagram of an example computing device that may be utilized in a hybrid communications system, in accordance with some embodiments.

FIG. 14 illustrates a block diagram of an example computing device 1450 that may be utilized in the hybrid communications system 700. For example, one or more computing devices 1450 may be particularly configured to be utilized as at least a portion of the data center 705, the vehicle data delivery network 706, the on-board node 720, or the device 718. Additionally, other devices as described herein such as the cockpit electronics node 1312 may include an embodiment of the computing device 1450.

The computing device 1450 may include, for example, one more central processing units (CPUs) or processors 1452, and one or more busses or hubs 1453 that connect the processor(s) 1452 to other elements of the computing device 1450, such as a volatile memory 1454, a non-volatile memory 1455, a display controller 1456, and an I/O controller 1457. The volatile memory 1454 and the non-volatile memory 1455 may each include one or more non-transitory, tangible computer readable storage media such as random access memory (RAM), read only memory (ROM), FLASH memory, a biological memory, a hard disk drive, a digital versatile disk (DVD) disk drive, etc.

In an embodiment, the memory 1454 and/or the memory 1455 may store instructions 1458 that are executable by the processor 1452. For example, in a computing device particularly configured to be included in the data center 705, the instructions 1458 may be the instructions comprising the hybrid communications distributor 704. In another example, in a computing device 1450 particularly configured to be the on-board node 720, the instructions 1458 may be the instructions comprising the hybrid communications collector 722. In yet another example, in a computing device 1450 particularly configured to be a device 718, the instructions 1458 may be the Vehicle Travel Application (VTA). Indeed, each of the modules, applications and engines described herein can correspond to a different set of machine readable instructions for performing one or more functions described above. These modules need not be implemented as separate software programs, procedures or modules, and thus various subsets of these modules can be combined or otherwise re-arranged in various embodiments. In some embodiments, at least one of the memories 1454, 1455 stores a subset of the modules and data structures identified herein. In other embodiments, at least one of the memories 1454, 1455 stores additional modules and data structures not described herein.

In an embodiment, the display controller 1456 may communicate with the processor (s) 1452 to cause information to be presented on a connected display device 1459. In an embodiment, the I/O controller 1457 may communicate with the processor(s) 1452 to transfer information and commands to/from the user interface 1460, which may include a mouse, a keyboard or key pad, a touch pad, click wheel, lights, a speaker, a microphone, etc. In an embodiment, at least portions of the display device 1459 and of the user interface 1460 are combined in a single, integral device, e.g., a touch screen. Additionally, data or information may be transferred to and from the computing device 1450 via a network interface 1470. In some embodiments, the computing device 1450 may include more than one network interface 1470, such as a wireless interface and a wired interface.

The illustrated computing device 1450 is only one example of a computing device suitable to be particularly configured for use in the hybrid communications system 700. Other embodiments of the computing device 1450 may be also be for use in the hybrid communications system 700, even if the other embodiments have more or fewer components than shown in FIG. 10, have one or more combined components, or have a different configuration or arrangement of the components. Moreover, the various components shown in FIG. 14 can be implemented in hardware, a processor executing software instructions, or a combination of both hardware and a processor executing software instructions, including one or more signal processing and/or application specific integrated circuits.

Figure 15:
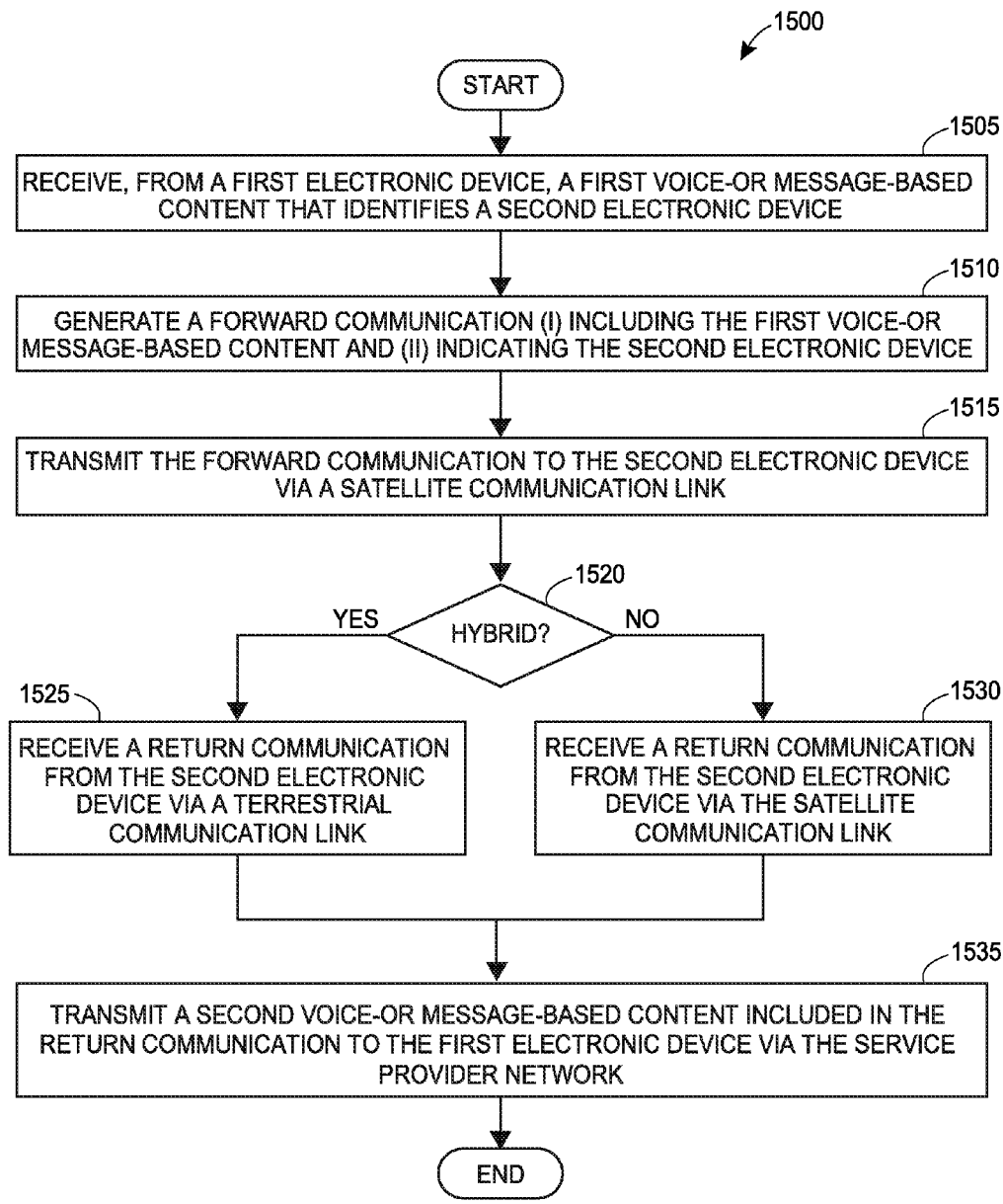
FIG. 15 illustrates an example method of communicating voice- or message-based content via various communication networks, in accordance with some embodiments.

FIG. 15 illustrates an example method 1500 for facilitating communications between a first electronic device connected to a terrestrial network and a second electronic device connected to an on-board communications network, via various communication networks. According to embodiments, the communications may be text- or message-based communications (e.g., an SMS message) or voice-based communications. The method 1500 may operate in conjunction with any or all portions of the systems, vehicles and/or electronic devices previously discussed with respect to FIGS. 1-14, or the method 1500 may operate in conjunction with other suitable systems, vehicles, and/or electronic devices. In an embodiment, at least a portion of the method 1500 may be performed by a data center including an SBC/SIP server and/or a registration server, such as the data center 129 as described with respect to FIG. 1 or the data center 705 as discussed with respect to FIG. 7.

At a block 1505, the data center can receive, from the first electronic device, a first voice- or message-based content that identifies the second electronic device. In particular, the first voice- or message-based content may be an SMS message received from an SMSC or an internet-based voice communication. In embodiments, the data center can further identify, from the first voice- or message-based content, a subscription identification associated with the second electronic device, whereby the subscription identification may be an MSISDN of the second electronic device.

At a block 1510, the data center may generate a forward communication that (i) includes the first voice- or message-based content and (ii) indicates the second electronic device. In generating the forward communication, the data center may include the MSISDN of the second electronic device. At a block 1515, the data center may transmit the forward communication to the second electronic device via a satellite communication link. In embodiments, the satellite communication link may be one of a $K_u$ band communication link or a $K_a$ communication link, or another satellite communication link, as discussed with respect to FIG. 7.

At a block 1520, the data center may determine whether a hybrid communication network is needed for the return communication. In some embodiments, a hybrid communication network may be utilized when an ATG network is available, such as if the vehicle is traveling over land (e.g., a flight within the United States). In other embodiments, a satellite-only network may be utilized when an ATG network is not available, such as if the vehicle is traveling over water (e.g., an international fight across the Atlantic Ocean). The need for a hybrid communication network may be determined before the vehicle begins its journey to allow the for proper network configuration.

If the data center determines that a hybrid communication network is needed for the return communication ("YES"), the data center may receive (block 1525) a return communication from the second electronic device via a terrestrial communication link. In contrast, if the data center determines that a hybrid communication network is not needed for the return communication ("NO"), the data center may receive (block 1530) a return communication from the second electronic device via the satellite communication link. In some embodiments, if the return communication is a message-based communication, the return communication may be in the form of a message of a specified protocol. In other embodiments, if the return communication is a voice-based communication, the return communication may be in the form of an internet-based voice communication request.

At a block 1535, the data center may transmit a second voice- or message-based content that is included in the return communication to the first electronic device via the service provider network. In cases in which the return communication is a message-based communication, the data center may convert the message into a SMS message before transmitting to the first electronic device. In cases in which the return communication is a voice-based communication, the data center may transmit the internet-based voice communication request to an ITSP for delivery to the first electronic device.

Of course, the applications and benefits of the systems, methods and techniques described herein are not limited to only the above examples. Many other applications and benefits are possible by using the systems, methods and techniques described herein.

Furthermore, when implemented, any of the methods and techniques described herein or portions thereof may be performed by executing software stored in one or more non-transitory, tangible, computer readable storage media or memories such as magnetic disks, laser disks, optical discs, semiconductor memories, biological memories, other memory devices, or other storage media, in a RAM or ROM of a computer or processor, etc.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques, methods, and structures described and illustrated herein without departing from the spirit and scope of the present claims. Accordingly, it should be understood that the methods and apparatus described herein are illustrative only and are not limiting upon the scope of the claims.

What is claimed is:

1. A method of providing communications to and from a first electronic device connected to a terrestrial network and a second electronic device connected to an on-board mobile communications network, the method comprising:
   receiving, from the first electronic device via a service provider network, a first voice- or message-based content that identifies the second electronic device;
   generating, by a processor, a forward communication (i) including the first voice- or message-based content and (ii) indicating the second electronic device;
   transmitting the forward communication from a data center to the second electronic device via a satellite communication link;
   receiving, at the data center via a reverse link supported by a first allocated frequency band, feedback information corresponding to the transmission of the forward communication to the second electronic device;
   receiving, at the data center, a return communication from the second electronic device via a terrestrial communication link, the return communication (i) including a second voice- or message-based content, and (ii) indicating the first electronic device;
   transmitting the second voice- or message-based content from the data center to the first electronic device via the service provider network;
   identifying a type of a subsequent forward communication received by the data center, wherein the type of the subsequent forward communication is at least one of: an application, configuration data, and software that the second electronic device requested to download; and
   selecting, by the data center, a forward link over which the subsequent forward communication is to be delivered from the data center to the second electronic device, the forward link supported by a second allocated frequency band different from the first allocated frequency band, wherein the data center selects the forward link based on (i) the feedback information and (ii) the type of the subsequent forward communication.

2. The method of claim 1, further comprising:
   identifying, based on the first voice- or message-based content, a subscription identification associated with the second electronic device.

3. The method of claim 2, wherein the subscription identification is a mobile subscriber integrated services for digital network (MSISDN) number, and wherein generating the forward communication comprises:
   generating the forward communication including the first voice- or message-based content and the MSISDN.

4. The method of claim 1, wherein receiving the return communication from the second electronic device comprises:
   receiving the return communication from the electronic device via an air-to-ground (ATG) communication link.

5. The method of claim 1, wherein transmitting the forward communication to the second electronic device comprises:
   transmitting the forward communication via one of a $K_u$ band communication link or a $K_a$ band communication link.

6. The method of claim 1, wherein receiving the first voice- or message-based content comprises:
   receiving a short message service (SMS) message from a short message service center (SMSC); and
   converting the SMS message into a message of a different protocol.

7. The method of claim 1, wherein receiving the return communication comprises:
   receiving an internet-based voice communication request; and wherein transmitting the second voice- or message-based content comprises:
   transmitting the internet-based voice communication request to an internet telephony service provider (ITSP) for delivery to the first electronic device.

8. The method of claim 1, wherein receiving the return communication comprises:
   receiving a message of a specified protocol; and
   converting the message of the specified protocol into a short message service (SMS) message.

9. A system for providing communications to and from a first electronic device connected to a terrestrial network and a second electronic device connected to an on-board mobile communications network, comprising:
   a communication module configured to send and receive data; and
   a data center comprising a memory and a processor, and communicatively connected to the communication module, the data center is configured to:
   receive, from the first electronic device via a service provider network, a first voice- or message-based content that identifies the second electronic device, generate a forward communication (i) including the first voice- or message-based content and (ii) indicating the second electronic device, transmit, via the communication module, the forward communication to the second electronic device via a satellite communication link, receive, by the communication module via a reverse link supported by a first allocated frequency band, feedback information corresponding to the transmission of the forward communication to the second electronic device, receive, via the communication module, a return communication from the second electronic device via a terrestrial communication link, the return communication (i) including a second voice- or message-based content, and (ii) indicating the first electronic device, transmit, via the communication module, the second voice- or message-based content to the first electronic device via the service provider network, identify a type of a subsequent forward communication received by the data center, wherein the type of the subsequent forward communication is at least one of: an application, configuration data, and software that the second electronic device requested to download, and select a forward link over which the subsequent forward communication is to be delivered from the data center to the second electronic device, the forward link supported by a second allocated frequency band different from the first allocated frequency band, wherein the forward link is selected based on (i) the feedback information and (ii) the type of the subsequent forward communication.

10. The system of claim 9, wherein the data center is further configured to:
identify, based on the first voice- or message-based content, a subscription identification associated with the second electronic device.

11. The system of claim 10, wherein the subscription identification is a mobile subscriber integrated services for digital network (MSISDN) number, and wherein to generate the forward communication, the data center is configured to:
generate the forward communication including the first voice- or message-based content and the MSISDN.

12. The system of claim 9, wherein to receive the return communication from the second electronic device, the data center is configured to:
receive the return communication from the electronic device via an air-to-ground (ATG) communication link.

13. The system of claim 9, wherein to transmit the forward communication to the second electronic device, the data center is configured to:
transmit the forward communication via one of a $K_u$ band communication link or a $K_a$ band communication link.

14. The system of claim 9, wherein to receive the first voice- or message-based content, the data center is configured to:
receive a short message service (SMS) message from a short message service center (SMSC), and
convert the SMS message into a message of a different protocol.

15. The system of claim 9, wherein to receive the return communication, the data center is configured to:
receive an internet-based voice communication request; and wherein to transmit the second voice- or message-based content, the data center is configured to:
transmit the internet-based voice communication request to an internet telephony service provider (ITSP) for delivery to the first electronic device.

16. The system of claim 9, wherein to receive the return communication, the data center is configured to:
receive a message of a specified protocol, and
convert the message of the specified protocol into a short message service (SMS) message.

17. A method of providing communications to and from a first electronic device connected to a terrestrial network and a second electronic device connected to an on-board mobile communications network, the method comprising:
receiving, from the first electronic device via a service provider network, a first voice- or message-based content that identifies the second electronic device;
generating, by a processor, a forward communication (i) including the first voice- or message-based content and (ii) indicating the second electronic device;
transmitting the forward communication from a data center to the second electronic device via a satellite communication link;
receiving, at the data center via a reverse link supported by a first allocated frequency band, feedback information corresponding to the transmission of the forward communication to the second electronic device;
receiving, at the data center, a return communication from the second electronic device via the satellite communication link, the return communication (i) including a second voice- or message-based content, and (ii) indicating the first electronic device;
transmitting the second voice- or message-based content from the data center to the first electronic device via the service provider network;
identifying a type of a subsequent forward communication received by the data center, wherein the type of the subsequent forward communication is at least one of: an application, configuration data, and software that the second electronic device requested to download; and
selecting, by the data center, a forward link over which the subsequent forward communication is to be delivered from the data center to the second electronic device, the forward link supported by a second allocated frequency band different from the first allocated frequency band, wherein the data center selects the forward link based on (i) the feedback information and (ii) the type of the subsequent forward communication.

18. The method of claim 17, wherein transmitting the forward communication to the second electronic device comprises:
transmitting the forward communication via one of a $K_u$ band communication link or a $K_a$ band communication link.

19. The method of claim 17, wherein receiving the first voice- or message-based content comprises:
receiving a short message service (SMS) message from a short message service center (SMSC); and
converting the SMS message into a message of a different protocol.

20. The method of claim 17, wherein receiving the return communication comprises:
receiving an internet-based voice communication request; and wherein transmitting the second voice- or message-based content comprises:
transmitting the internet-based voice communication request to an internet telephony service provider (ITSP) for delivery to the first electronic device.

* * * * *